US006679725B2

(12) United States Patent
Kidman

(10) Patent No.: US 6,679,725 B2
(45) Date of Patent: Jan. 20, 2004

(54) CLIP-ON COVER PLATE FOR ELECTRICAL FIXTURES

(75) Inventor: Brent L. Kidman, Spanish Fork, UT (US)

(73) Assignee: Quixemble, Inc., Spanish Fork, UT (US)

( * ) Notice: Subject to any disclaimer, the term of this patent is extended or adjusted under 35 U.S.C. 154(b) by 0 days.

(21) Appl. No.: 10/317,612

(22) Filed: Dec. 12, 2002

(65) Prior Publication Data

US 2003/0079898 A1 May 1, 2003

Related U.S. Application Data

(63) Continuation-in-part of application No. 09/974,306, filed on Oct. 10, 2001.
(60) Provisional application No. 60/343,332, filed on Dec. 21, 2001.

(51) Int. Cl.[7] .............................................. H01R 13/60
(52) U.S. Cl. ......................................... 439/536; 174/66
(58) Field of Search ................................ 439/536, 535, 439/538; 174/66, 55; 220/124

(56) References Cited

U.S. PATENT DOCUMENTS

| 867,624 | A | | 10/1907 | Warthen | |
|---|---|---|---|---|---|
| 1,113,762 | A | | 10/1914 | Eckman | |
| 1,933,358 | A | | 10/1933 | Almcrantz | 247/19 |
| 1,964,535 | A | | 6/1934 | Schreiber | 247/20 |
| 2,043,865 | A | * | 6/1936 | Place | 174/66 |
| 2,149,719 | A | | 3/1939 | Arnest | 220/3.4 |

(List continued on next page.)

FOREIGN PATENT DOCUMENTS

CA    1277409    12/1990    ............ H05K/5/02

OTHER PUBLICATIONS

Entratech Systems, INFOPLATE, http://www.entratechsystems.com/infoplate.html , pp. 1–4, Apr. 11, 2003.
INFOPLATE, Instructions and Specifications, 2001, pp. 1–2, (printed from website, http://www.entratechsystems.com/infoplate.html , on Apr. 11, 2003).
Pass & Seymour, Wiring Devices for Manufactured Housing, Panelized and Modular Construction, and Recreational Vehicles, Date Unknown, pp. 1–5.
Pass & Seymour, Self Contained Devices, Date Unknown (Possibly Jun., 1995), p. 1.
Leviton Decora Plus Snap–On Wallplates, http://www.leviton.com/sections/proinfo/decora/sheets/s5c7p9.htm , p. 1, Jun. 7, 2001.

Primary Examiner—Neil Abrams
Assistant Examiner—Phuong K T Dinh
(74) Attorney, Agent, or Firm—Pate Pierce & Baird

(57) ABSTRACT

A connection box system comprising an anchor configured to be removably secured to a fixture for delivery of a signal to a consuming device. The anchor may have a first engagement mechanism. A connection box may be configured to house lines proceeding from a signal source and terminating in the connection box for connection to the fixture. A receiver may be configured in association with the connection box to receive and retain the anchor. The receiver may have a second engagement mechanism to engage the first engagement mechanism of the anchor when the anchor is inserted therein without the aid of tools. Likewise, a face plate may be attached to the electrical fixture or connection box using clips hidden behind the surface thereof, without the use of tools. The clips may contact and retain the face plate by connecting to one or several engagement regions on the back face of the face plate.

24 Claims, 24 Drawing Sheets

U.S. PATENT DOCUMENTS

| | | | |
|---|---|---|---|
| 2,740,873 A | 3/1956 | Cronk | 200/168 |
| 2,980,756 A | 4/1961 | Kelleher | 174/57 |
| 3,155,808 A * | 11/1964 | Wiley | 200/330 |
| 3,168,612 A | 2/1965 | Sorenson | 174/57 |
| 3,488,428 A | 1/1970 | Smith | 174/51 |
| 3,662,085 A | 5/1972 | Robinson et al. | 174/48 |
| 3,770,872 A | 11/1973 | Brown | 174/53 |
| 3,814,834 A | 6/1974 | Glader | 174/57 |
| 3,848,764 A | 11/1974 | Salg | 220/3.6 |
| 3,859,454 A | 1/1975 | Mann | 174/66 |
| 3,928,716 A | 12/1975 | Marrero | 174/57 |
| 3,953,933 A | 5/1976 | Goldstein | 40/152 |
| 3,955,463 A | 5/1976 | Hoehn | 85/36 |
| 4,057,164 A | 11/1977 | Maier | 220/3.6 |
| 4,105,862 A | 8/1978 | Hoehn | 174/53 |
| 4,263,472 A | 4/1981 | Maheu | 174/51 |
| 4,281,773 A | 8/1981 | Mengeu | 220/3.2 |
| 4,295,003 A | 10/1981 | Borja et al. | 174/53 |
| 4,306,109 A | 12/1981 | Nattel | 174/51 |
| 4,315,100 A | 2/1982 | Haslbeck et al. | 174/51 |
| 4,580,689 A | 4/1986 | Slater | 220/3.2 |
| 4,793,059 A | 12/1988 | Moreau et al. | 29/854 |
| 4,837,406 A | 6/1989 | Emmons | 174/57 |
| 4,843,189 A | 6/1989 | Jorgensen et al. | 174/53 |
| 4,909,692 A | 3/1990 | Hendren | 411/544 |
| 4,936,396 A * | 6/1990 | Lockwood | 174/53 |
| 4,948,317 A | 8/1990 | Marinaro | 411/535 |
| 4,954,667 A | 9/1990 | Jorgensen et al. | 174/53 |
| 4,960,964 A | 10/1990 | Schnell et al. | 174/51 |
| 4,974,888 A | 12/1990 | Childers | 292/251 |
| 5,084,596 A | 1/1992 | Borsh et al. | 174/53 |
| 5,153,816 A | 10/1992 | Griffin | 361/393 |
| 5,170,013 A | 12/1992 | Borsh et al. | 174/53 |
| 5,170,014 A | 12/1992 | Borsh | 174/53 |
| 5,180,886 A | 1/1993 | Dierenbach et al. | 174/66 |
| 5,189,259 A | 2/1993 | Carson et al. | 174/66 |
| 5,223,673 A | 6/1993 | Mason | 174/53 |
| 5,407,088 A | 4/1995 | Jorgensen et al. | 220/3.9 |
| 5,477,010 A | 12/1995 | Buckshaw et al. | 174/67 |
| 5,675,125 A | 10/1997 | Hollinger | 174/66 |
| 5,696,350 A | 12/1997 | Anker | 174/66 |
| 5,723,817 A | 3/1998 | Arenas et al. | 174/66 |
| 5,744,750 A | 4/1998 | Almond | 174/49 |
| 5,842,822 A | 12/1998 | Everett et al. | 411/339 |
| 5,900,584 A | 5/1999 | Cady et al. | 174/66 |
| 5,965,845 A | 10/1999 | Reiker | 174/62 |
| 6,005,308 A | 12/1999 | Bryde et al. | 307/157 |
| 6,066,805 A * | 5/2000 | Bordwell et al. | 174/66 |
| 6,107,568 A | 8/2000 | Schnell et al. | 174/61 |
| 6,207,898 B1 | 3/2001 | Reiker | 174/61 |
| 6,218,617 B1 | 4/2001 | Estanislao et al. | 174/66 |

\* cited by examiner

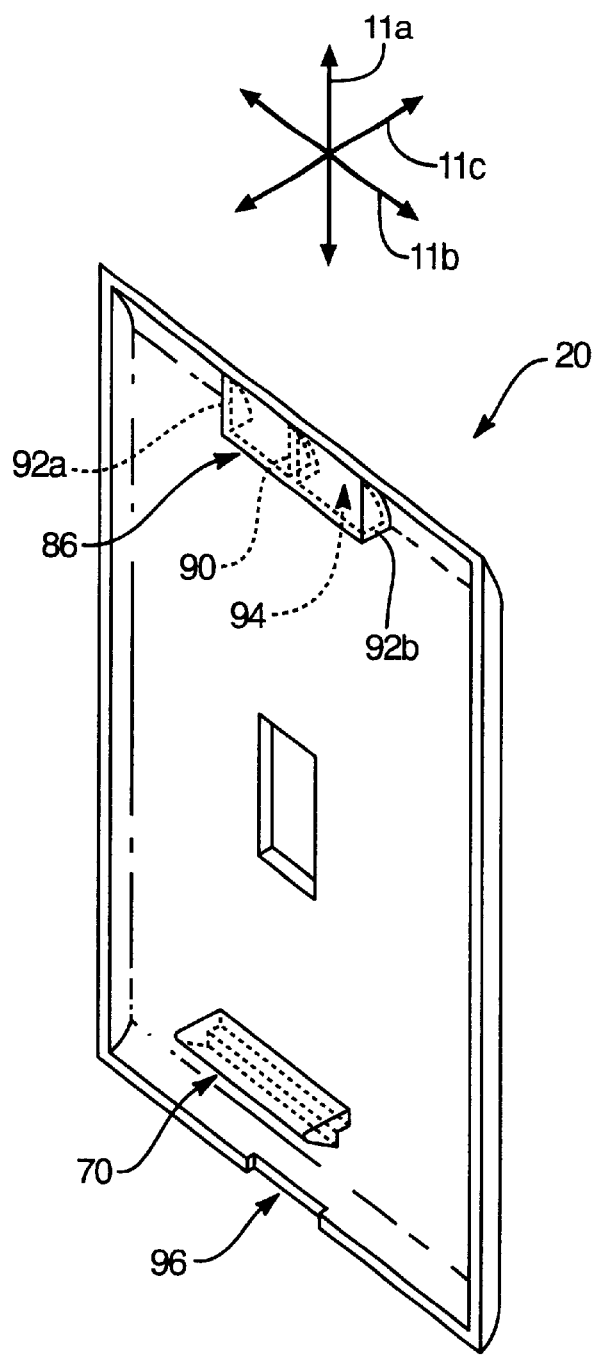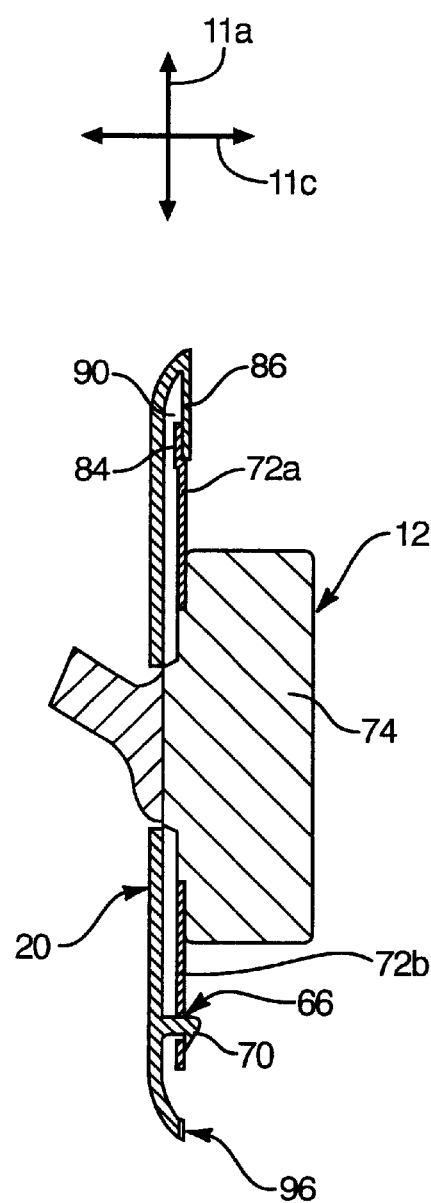
FIG. 19
FIG. 20

CLIP-ON COVER PLATE FOR ELECTRICAL FIXTURES

RELATED APPLICATIONS

This application is a continuation-in-part of Nonprovisional patent application Ser. No. 09/974,306 filed Oct. 10, 2001, and entitled QUICK ASSEMBLING ELECTRICAL CONNECTION BOX APPARATUS AND METHOD. This application also claims the benefit of U.S. Provisional Application No. 60/343,332 filed Dec. 21, 2001, entitled CLIP-ON COVER PLATE.

BACKGROUND

1. The Field of the Invention

This invention relates to fixture anchoring and, more particularly, to novel systems and methods for facilitating connection box assembly.

2. The Background Art

Manually installing screws or other fasteners is often time consuming. Additionally, in certain installations, the installer must employ his or her hands to hold several components as well as rotate a tool transferring rotation to a screw or other type of fastener. Maintaining all of the components in proper alignment is often difficult and requires skill. In any case, the complexity slows the installation process.

Power tools may simplify the installation process by providing the motion (e.g. rotation) necessary to advance or install a fastener. The power tool must, however, be held and positioned in a manner similar to a manual tool. Thus, the use of power tools may not significantly lessen the demands on the installer.

An electrical connection box assembly is one example of a time consuming fastener installation. Once an electrical fixture has been wired, the fixture is typically secured inside a connection box. Securement of the electrical fixture to the connection box often involves the installation of multiple screws. These screws are generally over an inch long and are relatively finely threaded. The length of the screws may be selected to accommodate various connection box placements and wall paneling thicknesses. To complete a conventional electrical connection box assembly, a face plate is secured to the fixture by another screw. Similar problems may be encountered in the installation of connections boxes used for a wide variety of devices and systems, including without limitation telephone, stereo, computer network, information systems, cable television system, and security systems fixtures.

The installation of the connection box screws requires an installer concurrently to hold a fixture, maintain screw alignment, and provide rotation to the screw. Often it is difficult to initiate engagement between the screw and the receiving hole. Such difficulty typically arises because the receiving hole may be obscured by the wall paneling or recessed into the wall. Once the screw is in engagement with the receiving hole, the time consuming and often laborious task of advancing the finely threaded screw remains.

Face plate screws and other securement devices may be unsightly as well as time consuming and laborious to install. Screws used to secure face plates to connection boxes and fixtures are typically painted and are, therefore, exposed to chipping, tarnishing, wear, and oxidation. In certain applications, it may be desirable to use a snap-on face plate to provide fast securement without the use of screws to provide securement.

Fixture installation may consume a large portion of an electrician's time budget for any given project. If the amount of time needed to install electrical fixtures were reduced, both the installer and the financier (e.g. home owner, developer, or the like) may realize large economic rewards.

Attempts have been made to provide quick assembling connection boxes and fixture assemblies. Quick assembling devices typically involve at least some rotation of the fixture screws and, therefore, require the use of tools for installation. Often these devices are limited in how well they are able to engage the threads of the fixture screws. Thus, such devices may not provide a reliable and solid securement between the fixture and connection box.

Typical screwless face plates require additional components to enable securement to the electrical fixture. These additional components increase manufacturing cost as well as installation time.

What is needed is an anchor that provides a strong and reliable securement between a fixture and associated connection box. Such an anchor would also provide for quick and simple installation thereof. Additionally, a screwless face plate that requires no additional components to accomplish a reliable securement would be an advancement in the art. Such a connection box assembly would greatly reduce the time, skill level, and effort required to assemble and complete connection box installation (e.g. electrical fixture installation or the like).

BRIEF SUMMARY AND OBJECTS OF THE INVENTION

In view of the foregoing, it is a primary object of the present invention to provide an apparatus and method requiring minimal time, effort, and skill to install.

It is a further object of the invention to provide a connection box apparatus and method that may be installed without screw rotation.

Consistent with the foregoing objects, and in accordance with the invention as embodied and broadly described herein, a method and apparatus are disclosed. An embodiment in accordance with the present invention may provide an apparatus for securing a fixture to a connection box. In a factory manufacturing process an anchor may be secured to a fixture. In one embodiment, the anchor is secured to the fixture by a releasable fastener. The anchor may have an engagement mechanism formed therewith.

A connection box may be provided to house lines or wires originating from a signal source to terminate therein. The lines may provide a connection for the fixture. A receiver may be associated with the connection box. The receiver may have an engagement mechanism formed to receive and retain the engagement mechanism of the anchor. Thus, the anchor and receiver may be intermediaries in the securement of the fixture to the connection box.

In certain applications, screws and other securement devices may be unsightly. In these applications it may be desirable to provide a snap-on face plate to provide fast securement without the use of screws. Face plates are often secured to fixtures to cover and hide the wiring and access holes therebehind. Face plates in accordance with the present invention may have engagement prongs. These prongs may be inserted through apertures in a corresponding fixture to maintain the face plate aligned securely thereagainst.

In selected embodiments in accordance with the present invention, an installer may first connect a fixture to the lines or wires housed in a connection box. A face plate may be installed by simply pressing the engagement prongs through the appropriate apertures in the fixture. Once a fixture has been connected to the lines and a face plate applied, the fixture may be secured to the connection box by inserting one or more of the attached anchors into corresponding receivers associated with the connection box. The anchors may be inserted a selected distance into the receivers until the face plate is properly positioned. Insertion of an anchor into a receiver may be accomplished without the aid of tools.

The method of engagement between the engagement mechanism of the receiver and that of the anchor may be selected to provide a fast, clean securement. In selected embodiments, the engagement mechanism of the receiver may be a barb configured to engage a series of teeth provided as part of the engagement mechanism of the anchor. In other embodiments, the engagement mechanism of the anchor may be a barb configured to engage a series of teeth provided as part of the engagement mechanism of the receiver. The engagement between the anchor and receiver may provide a single or multiple locking positions.

By applying embodiments in accordance with the present invention, a fixture may be secured to a connection box in a comparatively short amount of time. Embodiments in accordance with the present invention may be particularly advantageous when it is desirable to preserve the ability to remove the fixture from the connection box. For example, an electrician or computer network technician may need to remove a fixture to gain access to the lines or wiring tucked therebehind. In such a situation, the face plate may be "popped" off and the fasteners holding the fixture to the anchors may be released, thus freeing the fixture. Each anchor may maintain engagement with its corresponding receiver. After the revisions are complete the fixture may once again be secured to the anchors by the installation of the fastener previously released.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 19 is a perspective view of a fixture with a flange modified in accordance with the present invention to engage the screwless face plate of FIG. 18;

FIG. 20 is a side cross-sectional view of an engagement between the screwless face plate of FIG. 18 and the fixture of FIG. 19;

DETAILED DESCRIPTION OF THE PREFERRED EMBODIMENTS

It will be readily understood that the connection box assemblies of the present invention, as generally described and illustrated in the Figures herein, could be arranged and designed in a wide variety of different configurations. Thus, the description herein is not intended to limit the scope of the invention, but is merely representative of certain presently preferred embodiments of devices and systems in accordance with the invention. Those of ordinary skill in the art will, of course, appreciate that various modifications to the details herein may easily be made without departing from the essential characteristics of the invention, as described. Thus, the following information is intended only by way of example, and simply illustrates certain presently preferred embodiments consistent with the invention.

Figure 1:
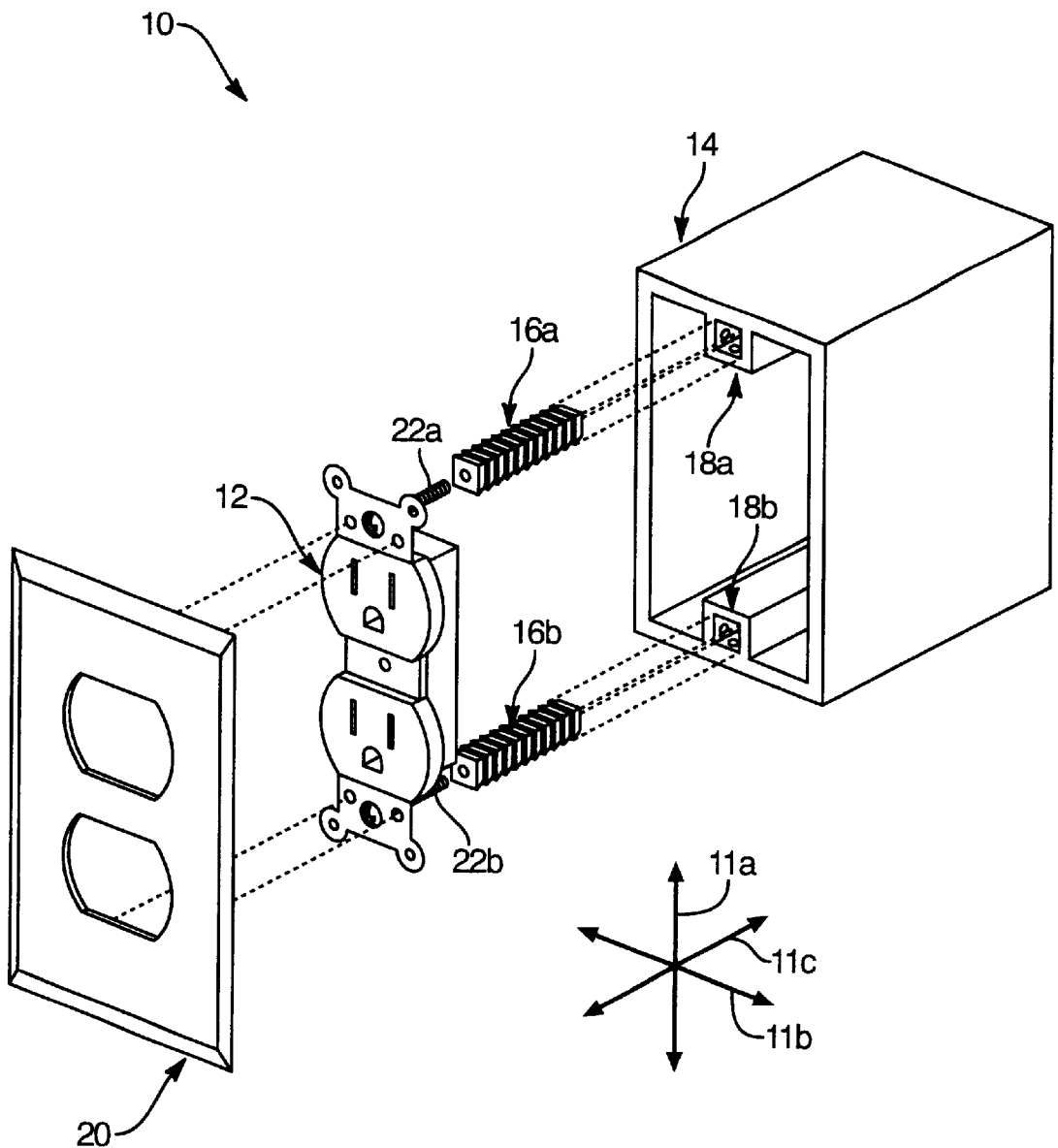
FIG. 1 is an exploded perspective view of a connection box assembly in accordance with the present invention.

Referring to FIG. 1, in discussing the Figures, it may be advantageous to establish a reliable coordinate system to aid in the description of several of the embodiments in accordance with the present invention. Coordinate axes 11 may be defined by longitudinal 11a, lateral 11b, and transverse directions 11c substantially orthogonal to one another.

A connection box assembly 10 in accordance with the present invention may provide an apparatus for securing a fixture 12 to a connection box 14. In a factory manufacturing process, an anchor 16 may be secured to the fixture 12. The connection box 14 to which the fixture 12 is to be secured may have a receiver 18 associated therewith for admitting and retaining the anchor 16. Thus, the anchor 16 and receiver 18 may be intermediaries in the securement of the fixture 12 to the connection box 14. A face plate 20 may be provided to cover and hide the wiring and access holes therebehind.

A fixture 12 may be any suitable piece for which securement is desired. For example, a fixture 12 may be a power receptacle, power switch, light fixture, telephone jack, network jack, cable connector, stereo system connector, information system connector, or any other unit 12 for which permanent or removable securement to a connection box 14 may be desired. In a similar manner, the connection box 14 may be any box to which a fixture 12 may be secured. A connection box 14 may be constructed of any suitable material. Suitable materials may include without limitation metals, polymers, composites, and the like. Additionally, a connection box 14, in accordance with the present invention, may be of any suitable size. For example, a connection box 14 may be a single gang, double gang, triple gang, quadruple gang, quintuple gang, or the like. The concepts presented herein are illustrated as a single gang box, however, the principles and concepts may easily be expanded to multiple-gang connection boxes.

Embodiments in accordance with the present invention may be particularly well suited to assemblies that may be assembled in the field (i.e. not in a factory). Such field assemblies need not be limited to connection box assemblies 10. Embodiments in accordance with the present invention may provide convenience and ease of assembly in the field where less than perfect conditions are often encountered.

An anchor 16 in accordance with the present invention may be constructed, formed, machined, extruded, molded, cast, or otherwise made from any suitable material. Suitable materials may include without limitation metals, polymers, composites, or the like. For example, in certain embodiments, an anchor 16 may be formed of a polymer in a molding process.

An anchor 16 may be secured to a fixture 12 in any suitable manner. In certain embodiments, an anchor 16 may be secured to a fixture 12 by a fastener 22 such as a bolt, rivet, screw, engagement prong, engagement hook, or the like. In other embodiments, an anchor 16 may be glued or otherwise bonded to a fixture 12. Additionally, an anchor 16 may be formed as an integral part of the fixture 12.

Each form of attachment between the anchor 16 and the fixture 12 may have particular advantages. In certain applications, such as the installation of power receptacles 12, switches 12, computer network outlets 12, cable television outlets 12, and the like an installer may need to remove a fixture 12 to gain access to something (e.g. wiring) tucked therebehind. In such a situation, screws 22 may provide an ideal attachment between the anchor 16 and the fixture 12. The screws 22 may be removed, thus freeing the fixture 12. The anchors 16 may maintain engagement with the connection box 14. After the revisions are complete the fixture 12 may once again be secured to the anchors 16 by the insertion of the screws 22 previously removed.

In selected applications, multiple points of securement between a fixture 12 and a connection box 14 may exist. In such situations, an anchor 16 in accordance with the present invention may be applied to all or a subset of the securement locations. For example, power receptacles 12 and switches 12 are typically secured to connection boxes 14 by two screws spaced from each other in a longitudinal direction 11a. An anchor 16a, 16b may be applied to fasteners 22a, 22b respectively. Similarly, a connection box 14 may have multiple receivers 18a, 18b to engage both anchors 16a, 16b, respectively.

The method of engagement between a receiver 18 and an anchor 14 may be selected to provide a fast, clean securement. By so doing, the fixture 12 may be secured to the connection box 14 in a minimum amount of time. For example, installers (e.g. electricians, network technicians, cable television installers, and the like) spend a large portion of their installation time screwing fixtures 12 to connection boxes 14. In certain embodiments in accordance with the present invention, a fastener 22 (e.g. screw 22) may be introduced to secure an anchor 16 to the appropriate locations on a fixture 12 by a manufacturing machine. Thus, the installation of the fastener 22 may be performed in ideal conditions with proper alignment and fast tool speeds. In the field, when an installer installs the fixture 12, the time consuming screw installation no longer needs to be performed. An anchor 16 may simply be inserted into a receiver 18.

The embodiments of the fixture 12, connection box 14, anchors 16a, 16b, receivers 18a, 18b, and face plate 20, as illustrated in FIG. 1 may be arranged and designed in a wide variety of different configurations that fall within the scope of the present invention. Thus, the description hereinabove is not intended to limit the scope of the possible embodiments, but is merely representative of certain presently preferred embodiments of devices and systems in accordance with the invention. The information is intended only by way of example.

Figure 2:
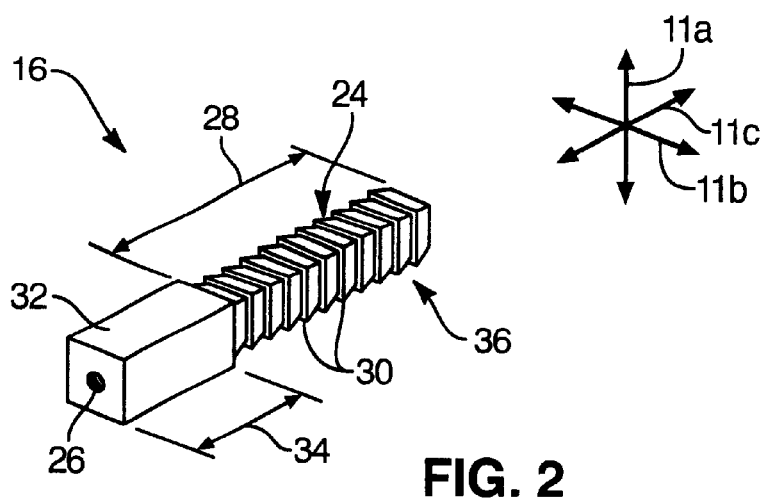
FIG. 2 is a perspective view of one embodiment of an anchor in accordance with the present invention.

Referring to FIG. 2, an anchor 16 in accordance with the present invention may have an engagement mechanism 24 configured to provide a mechanical grip with a receiver 18. If an anchor 16 is to be secured to a fixture 12 by a bolt 22 or screw 22, an aperture 26 may be formed therein. The aperture 26 may extend completely or only partially through the anchor 16 in a transverse direction 11c.

A length 28 of the engagement mechanism 24 may be selected to provide a desired number of engagement locations 30. In selected embodiments, each engagement location 30 is a tooth 30. Additionally, the engagement length 28 and the number of engagement locations 30 may be selected to permit insertion of the anchor 16 a desired distance into the receiver 18. Thus, providing a desired alignment of the fixture 12 with respect to the connection box 14.

In selected embodiments, an anchor 14 in accordance with the present invention may include a spacer 32. The length 34 of the spacer 32 may be selected to provide additional control over the spacing of the fixture 12 in relation to the connection box 14.

In certain embodiments, one end 36 of the anchor 16 may be formed to promote easy insertion into the receiver 18. For example, an end 36 may be pointed, rounded, tapered, or otherwise formed.

An anchor 16 in accordance with the present invention may have any suitable cross-section. For example, the cross-section may be rectangular, circular, triangular, oval, an unconventional shape, or the like. The cross-sectional shape of an anchor 16 may be selected to resist rotation about a transverse axis 11c once installed inside a receiver 18. For example, an anchor 16 having a generally circular cross-section may have a key-way formed therein to correspond to a key formed or located in the receiver 18.

The shape and configuration of a receiver 18 may be selected to match and complement the particular shape of a selected anchor 16. For example, if an anchor 16 having a rectangular cross section is desired, the receiver 18 may be formed to have a generally rectangular shape. Thus, the receiver 18 may admit the anchor 16 and hold the anchor 16 securely without motion (e.g rotation about a transverse axis 11c) therebetween.

Figure 3:
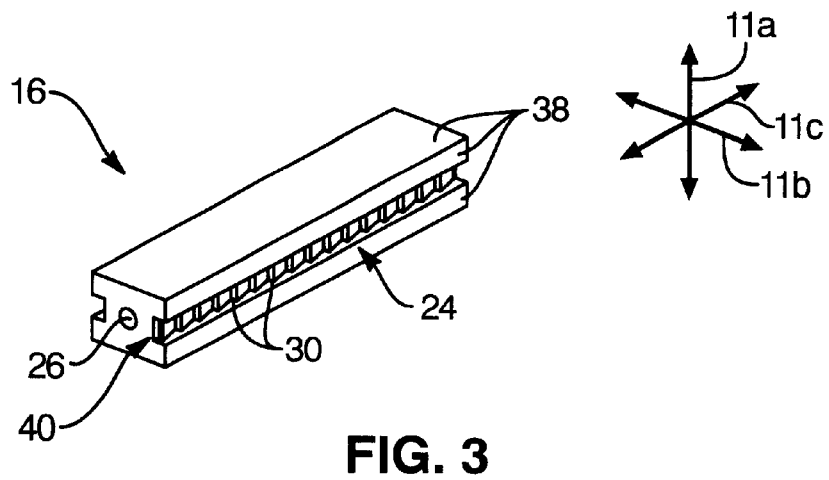
FIG. 3 is a perspective view of an alternative embodiment of an anchor in accordance with the present invention.

Referring to FIG. 3, in certain embodiments, an anchor 16 may have multiple sliding surfaces 38 to promote ease of insertion and proper alignment. A recessed groove 40 may be formed in one or more surfaces 38 of the anchor 16 to provide a location for disposition of an engagement mechanism 24. Such an engagement mechanism 24 may be recessed to reduce the risk of interfering with proper insertion of the anchor 16 into the receiver 18.

Figure 4:
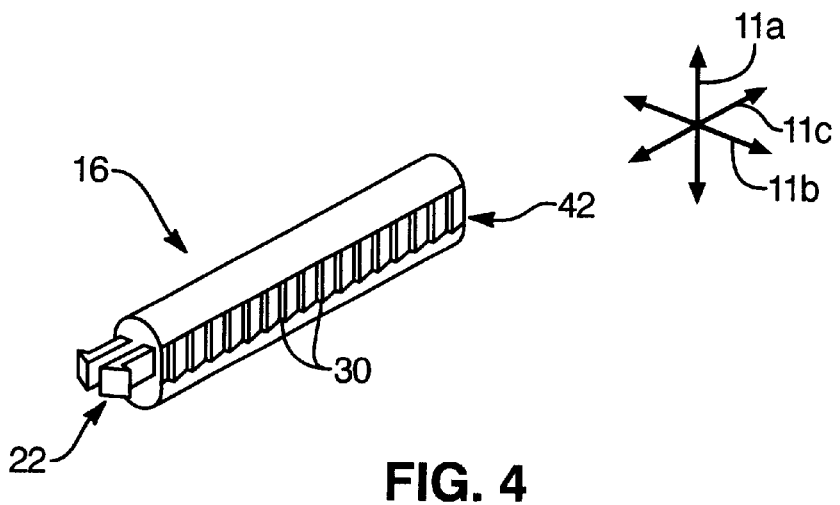
FIG. 4 is a perspective view of another alternative embodiment of an anchor in accordance with the present invention.

Referring to FIG. 4, an anchor 16 may have a generally circular cross-section. In such an embodiment, the anchor may include a single flat 42 or may include a plurality of flats 42 that provide a location for disposition of an engagement mechanism 24. The flats 42 may also provide a location for a corresponding receiver 18 to engage the anchor 16 to resist rotation about a transverse axis 11c.

FIG. 4 also illustrates an alternative embodiment of a fastener 22 in accordance with the present invention. Opposing engagement hooks 22 may be shaped to promote insertion into a corresponding aperture in a fixture 12. The engagement hooks 22 may be formed to engage an aperture of any suitable shape (e.g. circular, oval, triangular, or the like). The illustrated engagement hooks 22 have been formed in a shape to fit a square aperture. A square aperture may provide a mechanism to resist rotation of the anchor 16 about a transverse axis 11c with respect to a corresponding fixture 12. Engagement hooks 22 in accordance with the present invention may flex to allow an anchor 16 to be separated from the fixture 12 to which the anchor 16 is attached. Once separated, the anchor 16 and fixture 12 may be reattached by reinserting the engagement hooks 22 of the anchor 16 through the corresponding aperture in the fixture 12.

The embodiments of anchors 16, as illustrated in FIGS. 2–4 could be arranged and designed in a wide variety of different configurations that fall within the scope of the present invention. Thus, the description hereinabove is not intended to limit the scope of the possible embodiments, but is merely representative of certain presently preferred embodiments of devices and systems in accordance with the invention. The information is intended only by way of example and not by way of limitation.

Figure 5:
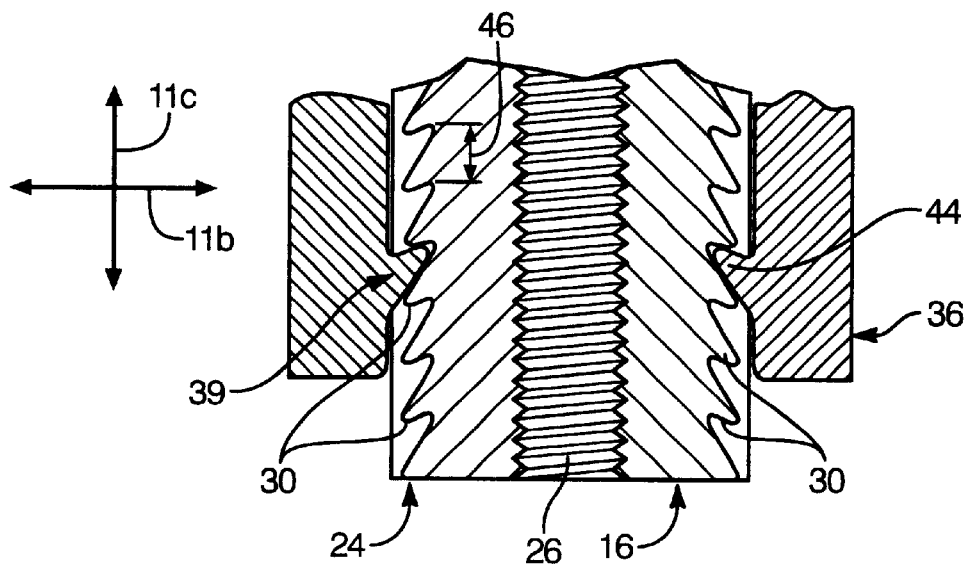
FIG. 5 is a top cross-sectional view of an engagement between an anchor and receiver in accordance with the present invention.
Figure 6:
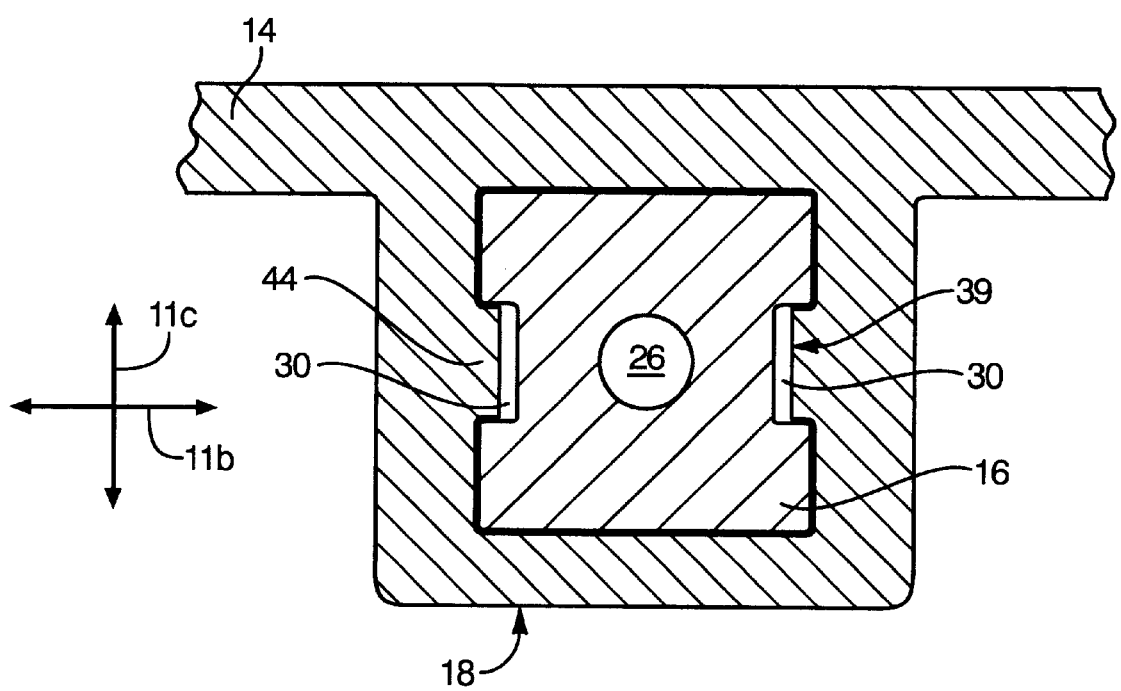
FIG. 6 is a front cross-sectional view of the engagement of FIG. 5.

Referring to FIGS. 5–6 while continuing to refer generally to FIGS. 1–4, as discussed hereinabove, an anchor 16 in accordance with the present invention may have multiple sliding surfaces 38. The sliding surfaces 38 may maintain proper alignment of the anchor 16 with respect to the receiver 18.

In selected embodiments, a receiver 18 in accordance with the present invention may include an engagement mechanism 39. This engagement mechanism 39 may be configured to engage the engagement mechanism 24 of an anchor 16. In selected embodiments, an engagement mechanism 39 may comprise hooks 44 or barbs 44. These barbs 44 may extend from the receiver 18 with a shape selected to engage the teeth 30 of the anchor 16. The engagement of the hooks 44 and teeth 30 may be selected to provide unidirectional motion so that an anchor 16 may be easily inserted yet resist removal in a transverse direction 11c. The number of teeth 30 and the incremental distance 46 therebetween may be selected to provide a continuum of possible locking positions between the anchor 16 and the receiver 18.

Figure 7:
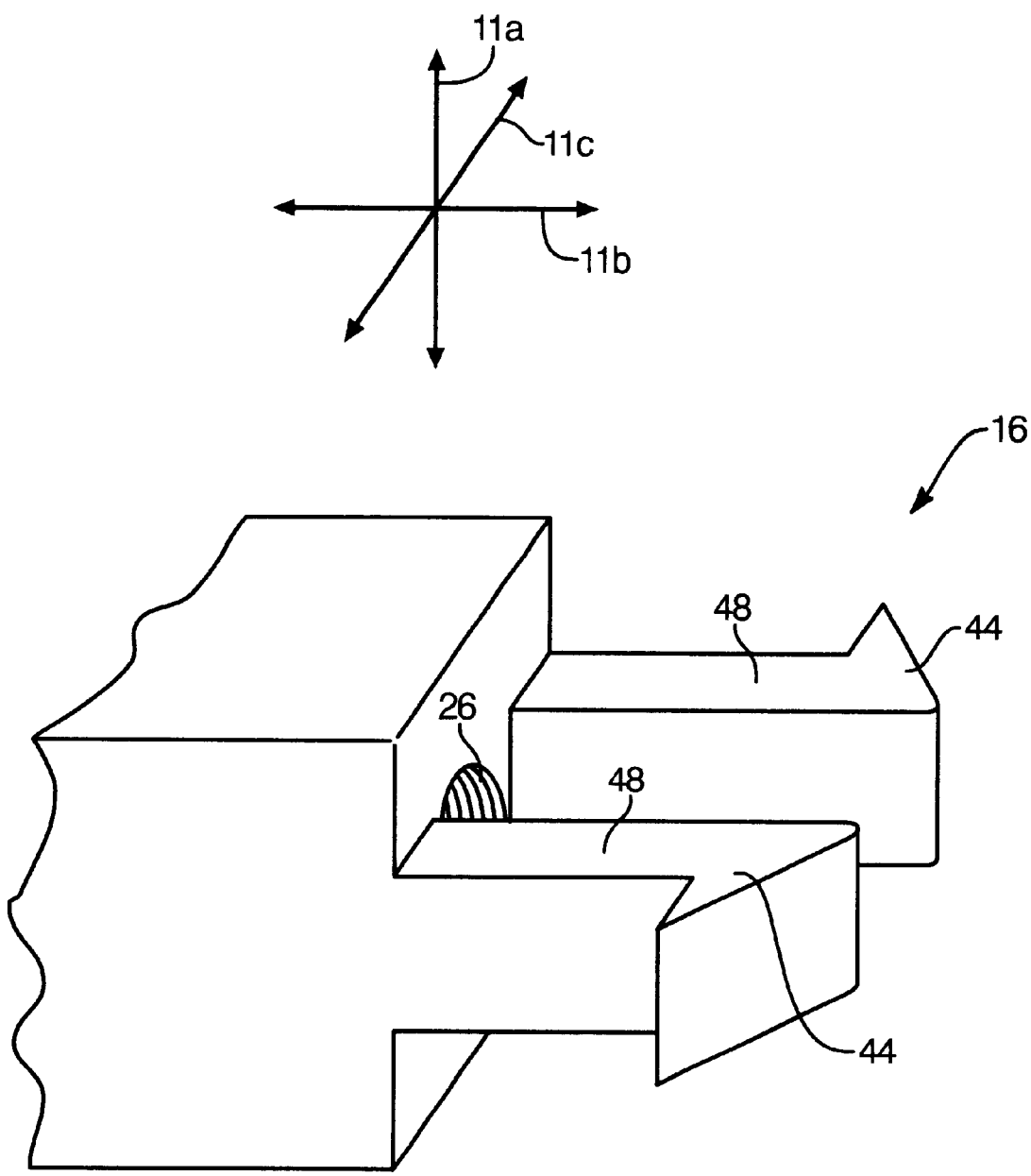
FIG. 7 is a partial perspective view of an alternative embodiment of an anchor in accordance with the present invention.
Figure 8:
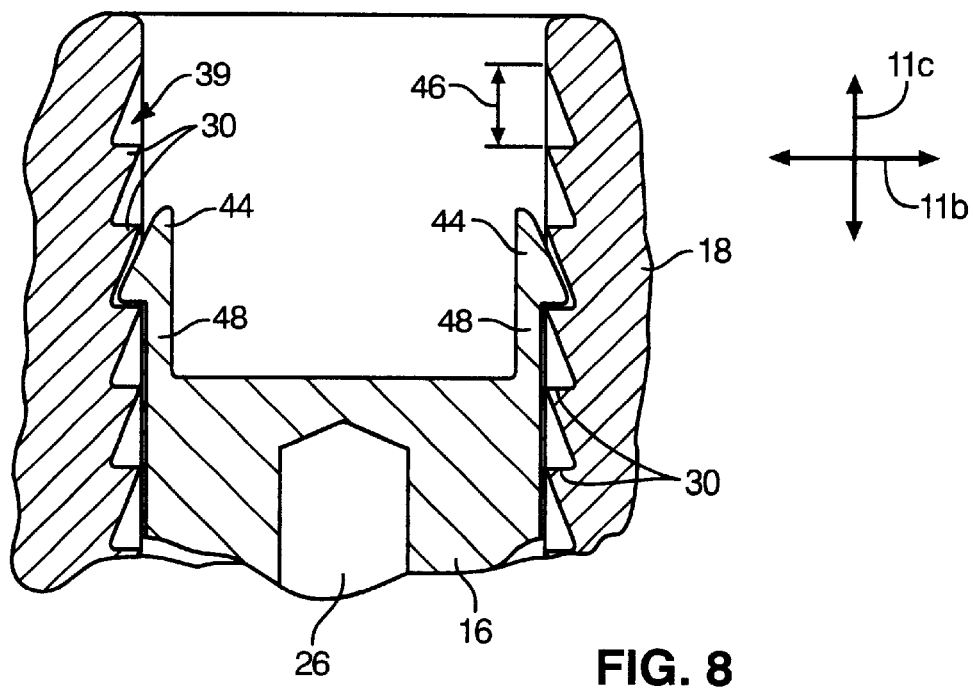
FIG. 8 is a top cross-sectional view of an alternative engagement between an anchor and receiver in accordance with the present invention.

Referring to FIGS. 7–8 while continuing to refer generally to FIGS. 1–6, in an alternative embodiment, an anchor 16 may include a single hook 44. In selected embodiments, an anchor 16 may include multiple hooks 44. A flexible region 48 may permit a hook 44 to flex as it "clicks" or passes over the teeth 30 of a receiver 18. As discussed hereinabove and as best shown in FIG. 8, the number of teeth 30 and the incremental distance 46 therebetween may be selected to provide a continuum of possible locking positions between the anchor 16 and the receiver 18.

Figure 9:
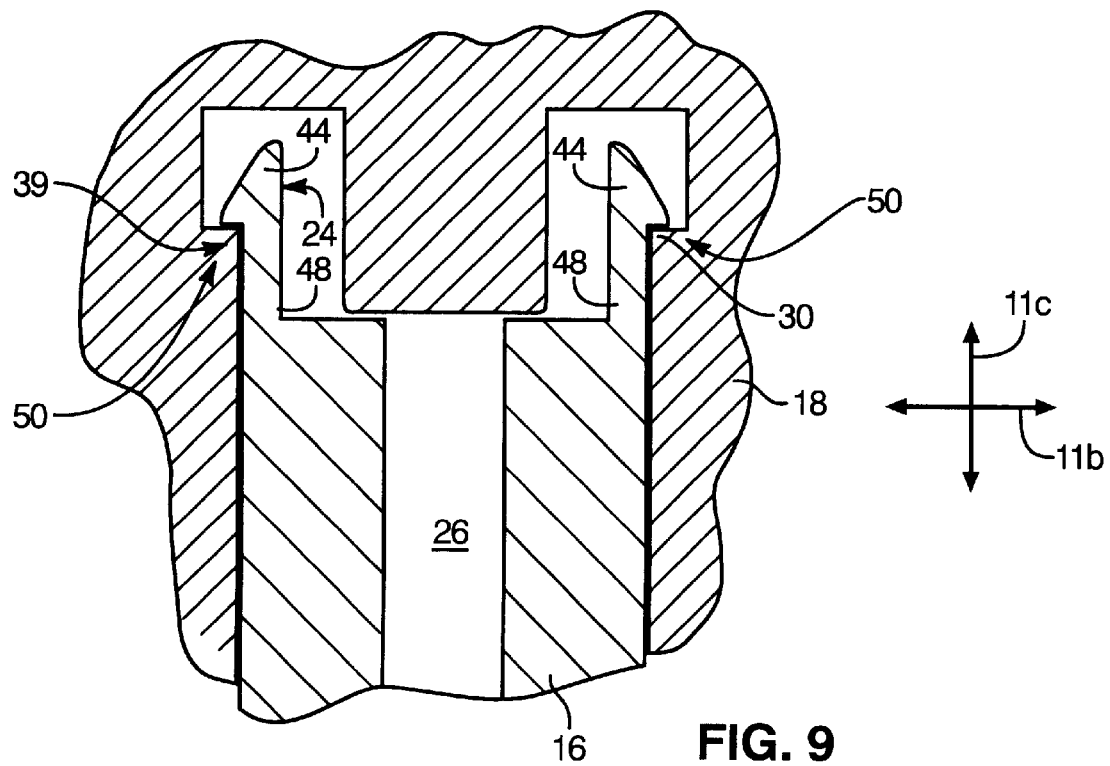
FIG. 9 is a top cross-sectional view of another alternative engagement between an anchor and receiver in accordance with the present invention.

Referring to FIG. 9, in selected embodiments, the engagement between an anchor 16 and a receiver 18 may not be incremental, rather a single locking position may be defined. In such an embodiment, the anchor 16 may be inserted into the receiver 18 until a lock 50 is activated. In selected embodiments, a lock 50 may consist of a hook 44 secured on the distal end of a flexible region 48. A stop 52 may provide a register to correctly position the anchor 16 with respect to the receiver 18. When the anchor 16 is inserted to the stop 52, a hook 44 may engage an engagement location 30 of the receiver 18.

Figure 10:
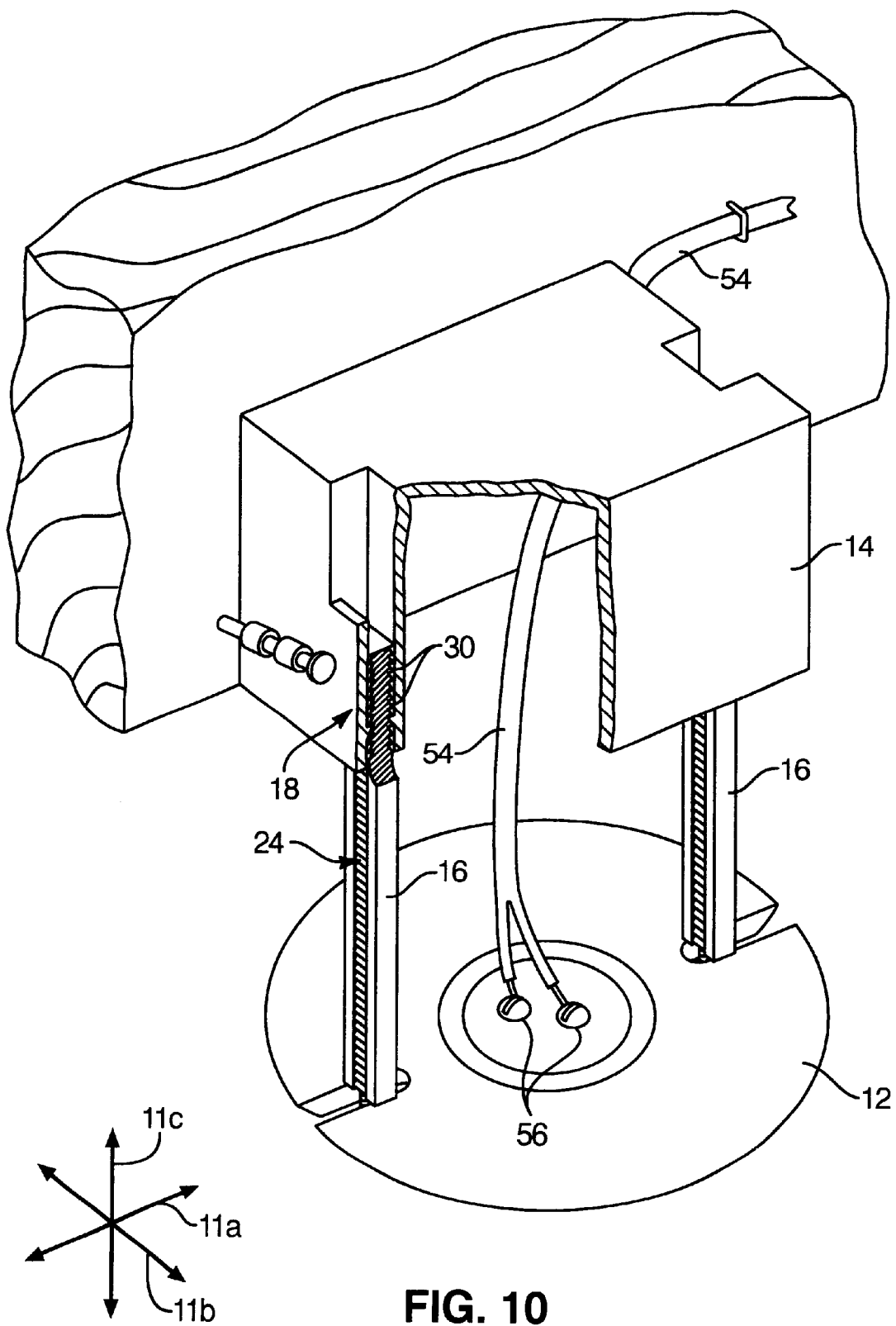
FIG. 10 is a partial cutaway, perspective view of an application of a quick assembling connection box in accordance with the present invention.

Referring to FIG. 10, the length 28 (see FIG. 2) of the engagement mechanism 24 may be selected to best match the particular application to which the engagement mechanism 24 may be applied. For example, the installation of a light fixture 12 may be simplified by employing a comparatively long anchor 16 having a similarly long engagement mechanism 24. In such an application, two long anchors 16 may be secured to the fixture 12. The anchors 16 may be introduced into the corresponding receivers 18 a distance sufficient to engage the engagement mechanisms 39 thereof. The anchors 16 may then hold the fixture 12 in place while the installer proceeds to connect the necessary wires 54. Upon completion of the connecting of the wires 54, the fixture 12 may be pushed in a transverse direction 11c until a proper position is achieved. Thus, the installer need not hold the fixture 12 while connecting wires 54 and tightening terminal screws 56.

Figure 11:
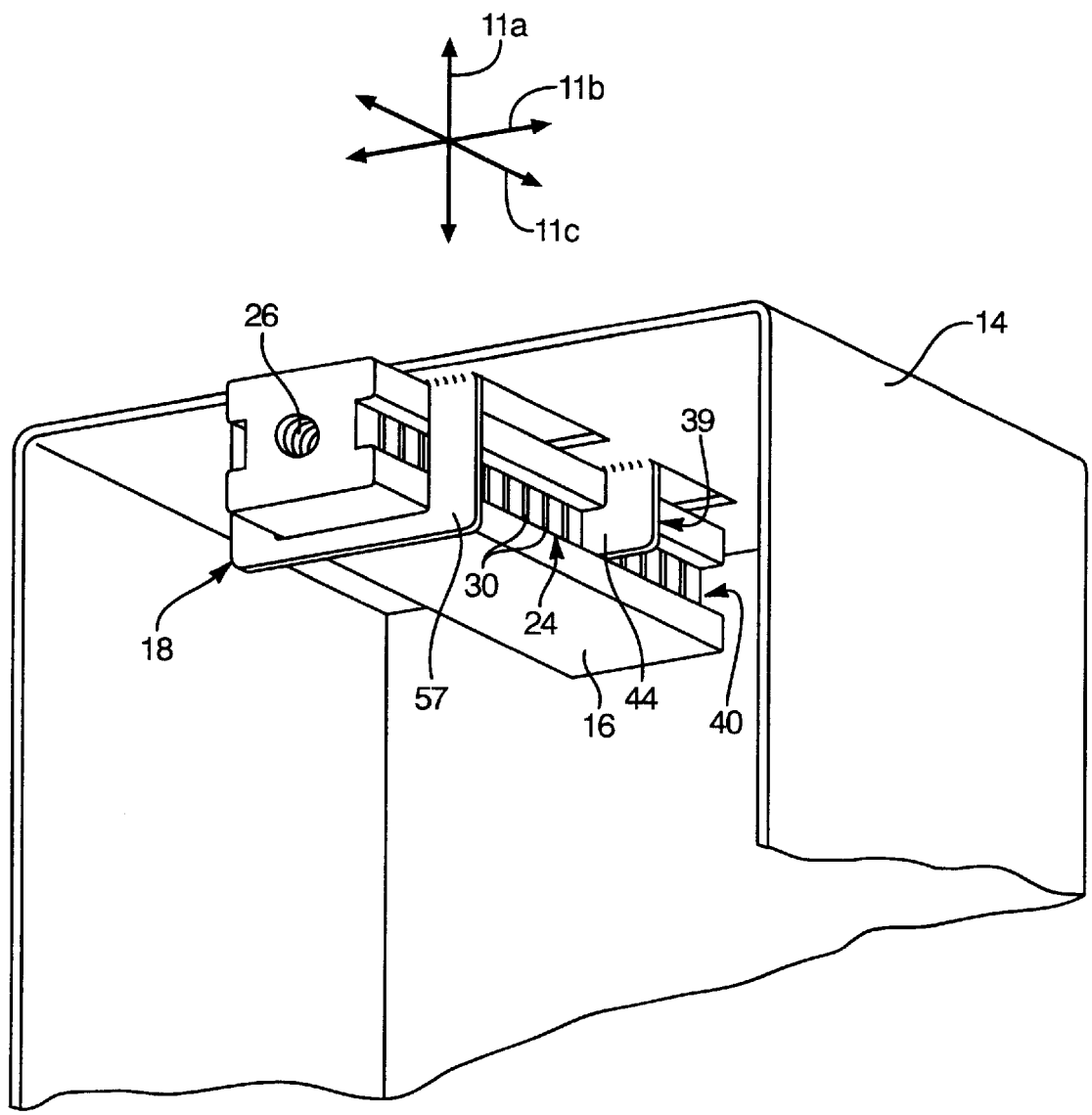
FIG. 11 is a perspective view of a receiver in accordance with the present invention formed as part of a metal connection box.

Referring to FIG. 11, a receiver 18 may be associated with a connection box 14 in any suitable manner. In selected embodiments, the receiver 18 may be formed as an integral part of the connection box 14. This forming may be part of a molding process. That is, the receiver 18 may be molded as part of the connection box 14 in its original forming process. FIG. 11 illustrates an embodiment in which the receiver 18 is formed by stamping selected shapes from a metal connection box 14 and then bending the cut portions in a selected direction to form a guide 57 and an engagement mechanism 39. In an alternative embodiment, a receiver 18 may be formed (e.g. molded, extruded, cast, machined, stamped, or the like) and then joined to the connection box 14. Such a joining may be accomplished by bolting, screwing, welding, gluing, bonding, or the like.

Figure 12:
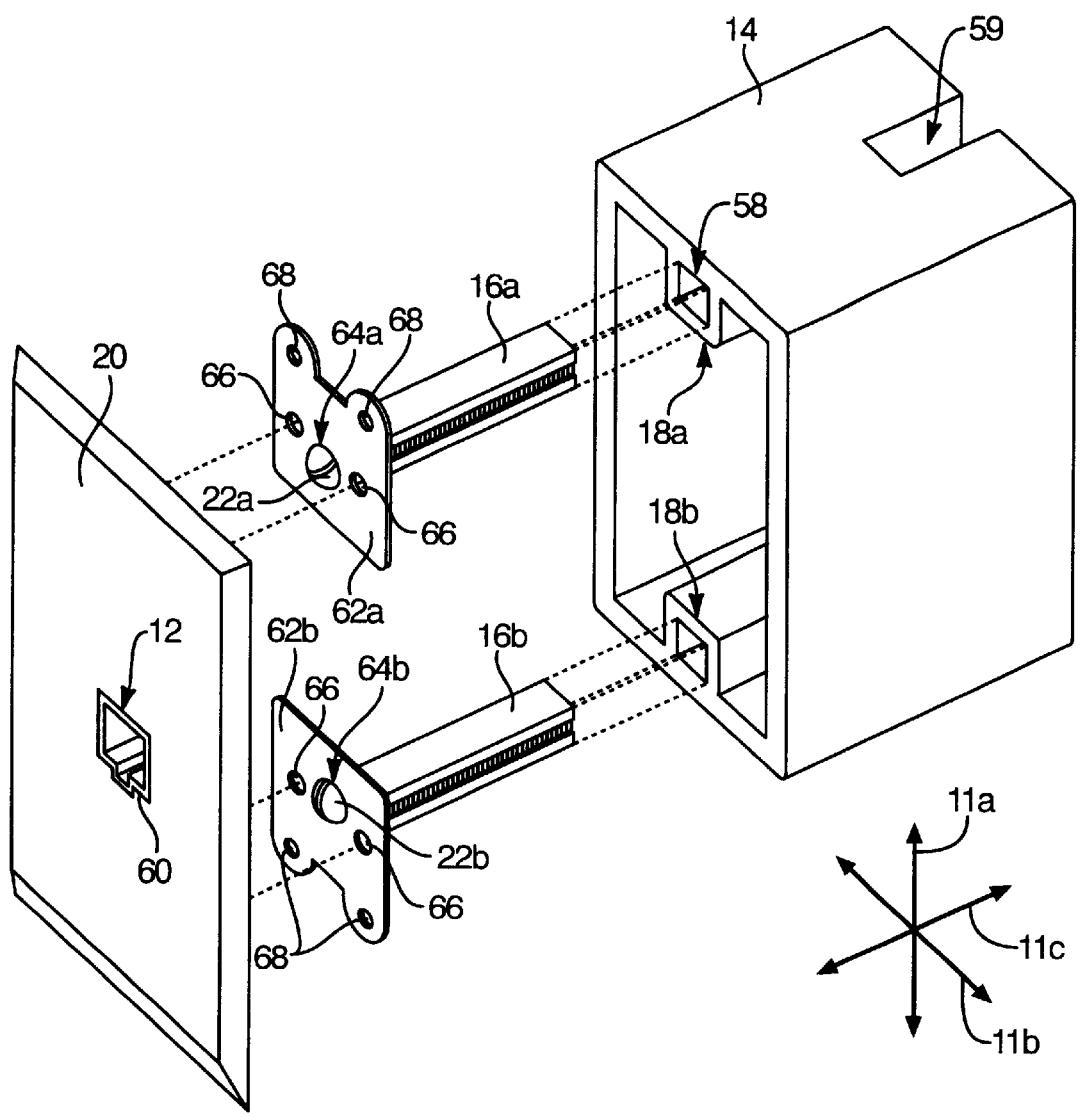
FIG. 12 is an exploded perspective view of an alternative embodiment of a face plate and fixture assembly in accordance with the present invention.

Referring to FIG. 12, connection boxes 14 are typically installed and wired before the installation of the wall paneling (e.g., ceiling paneling and the like). Fixtures 12 and face plates 20 are typically installed after the installation of the wall paneling. The installation of wall paneling often involves the application of dry wall compound. It is very common for clumps of dry wall compound to be inadvertently introduced inside a previously installed connection box 14. Receivers 18 in accordance with the present invention may be formed in a manner to greatly limit the adverse effects of misplaced dry wall compound.

For example, if dry wall compound were placed in the receiver entrance 58, the receiver may be formed to have an open back exit 59. Thus, anchor 16 may be inserted into the receiver 18 and any clump of dry wall compound may simply be pushed out the back 59 of the receiver 18. The back 59 may be open to the exterior of the connection box 14. The back 59 may also be configured to open to the interior of the connection box 14. In such a configuration, a dry wall compound clump will be pushed to the interior of the connection box 14 where it can do no harm.

Embodiments in accordance with the present invention may be applied to any unit 12 for which permanent or removable securement to a connection box 14 is desired. Data terminals such as phone jacks, network jacks, cable connections, and the like may not have a fixture 12 associated therewith. These applications may deliver a transmission line to a jack 60 or connector 60 mounted directly in a face plate 20. The face plate 20 provides the structure and support for the jack 60, and indeed may provide many of the same functions as a fixture 12. Typically these face plates have been secured directly to a corresponding connection box by multiple screws. Installation of the such screws presents difficulties similar to those encountered in the installation of fixtures 12.

FIG. 12 illustrates one embodiment of a jack connection box assembly 10 in accordance with the present invention. Interface members 62a, 62b may provide an interface between a face plate 20 and anchors 16a, 16b. In selected embodiments, the interface members 62 may include an aperture 64 to accommodate securement of an anchor 16. Additional apertures 66 may provide locations for the face plate 20 to engage the interface members 62. In certain embodiments, extensions 68 or "dog ears" 68 may be incorporated to hold each interface member 62 flush with the wall paneling.

The interface members 62 may be formed in any suitable shape for providing adequate engagement between an anchor 16 and a face plate 20. In one embodiment, the interface members 62 are generally flat pieces having multiple apertures 64, 66 and extensions 68. The interface members 62 may be constructed of any suitable material. In selected embodiments, interface members 62 may be formed by stamping sheet metal. In alternative embodiments, interface members 62 may be molded from a polymer, a composite, or the like.

Figure 13:
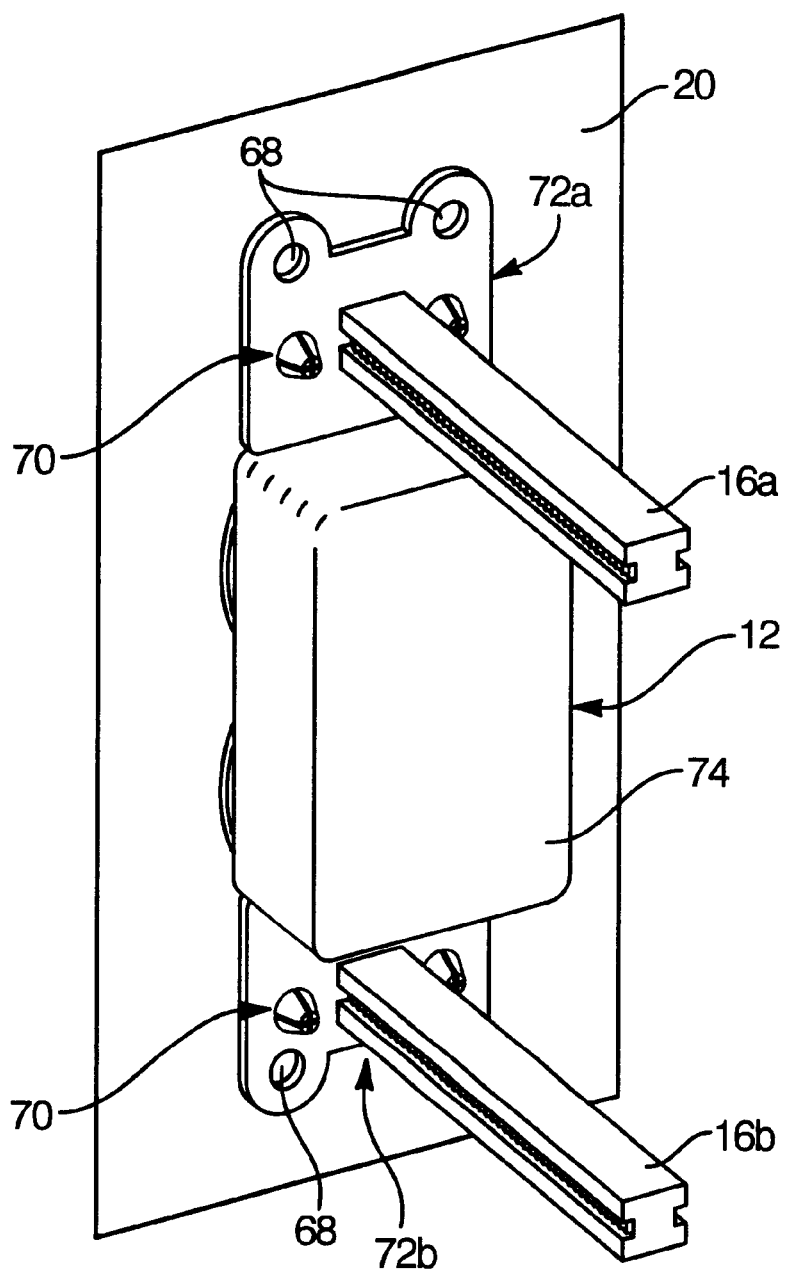
FIG. 13 is a perspective view of a complete assembly prepared for installation in accordance with the present invention.
Figure 13:
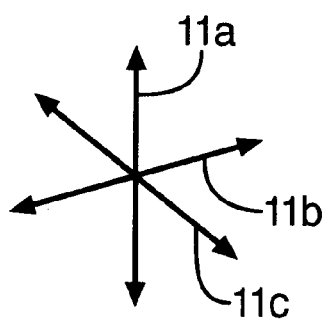
Figure 14:
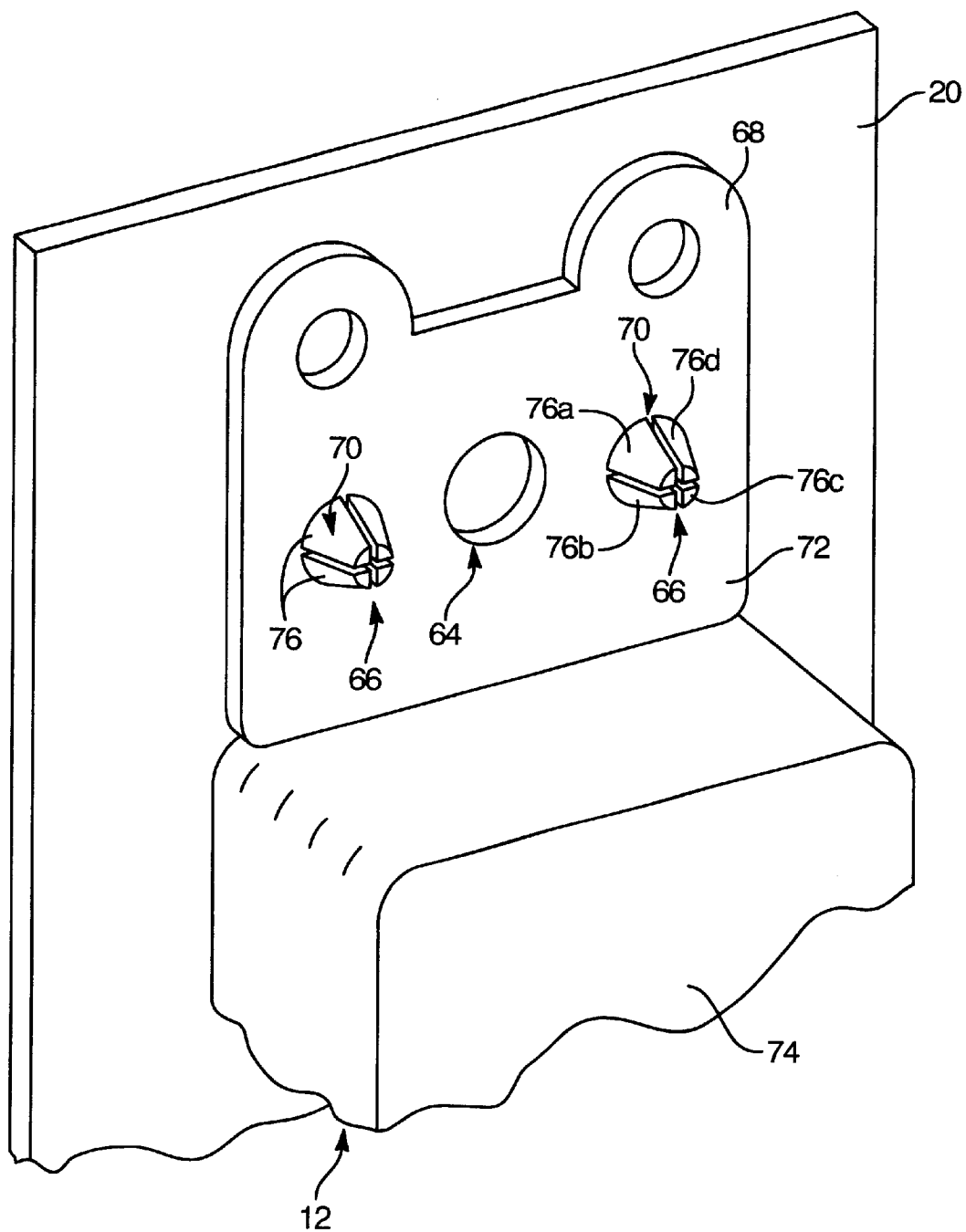
FIG. 14 is a partial perspective view of a face plate and fixture assembly in accordance with the present invention.
Figure 14:
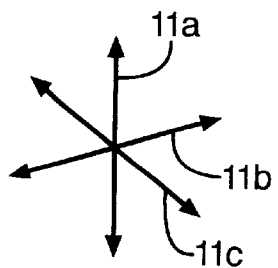
Figure 15:
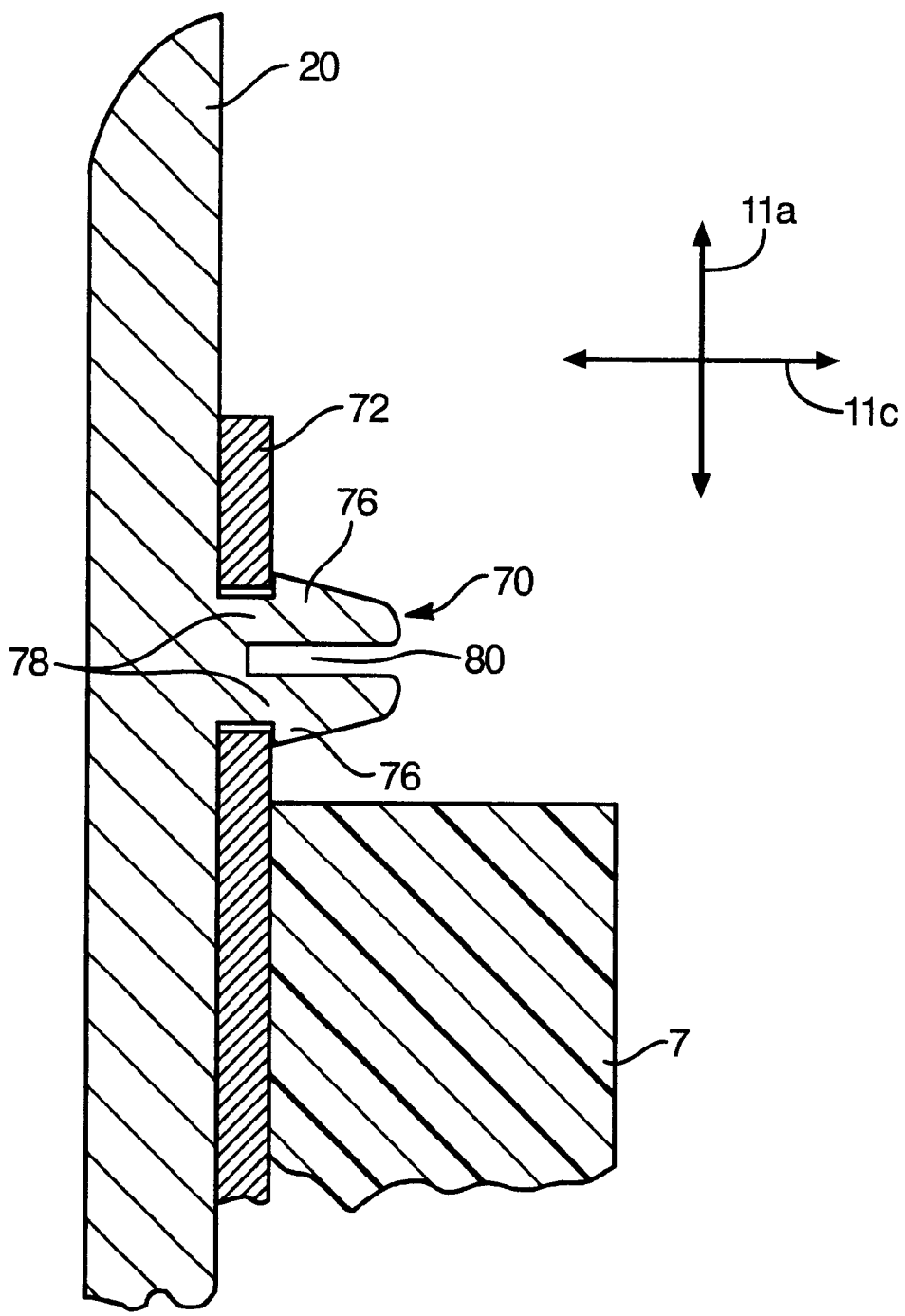
FIG. 15 is a side cross-sectional view of a screwless face plate assembly using an adapter in accordance with the present invention.

Referring to FIGS. 13–15, as discussed hereinabove, after the installation of a fixture 12, a face plate 20 is typically secured thereto to hide the under workings from view. Conventional face plates 20 are often secured by at least one screw. Screws and other securement devices may be unsightly. Screws used to secure face plates 20 to receptacles and switches are typically painted and are, therefore, exposed to chipping, tarnishing, wear, oxidation, and the like. In such applications, it may be desirable to provide a snap-on assembly to provide fast securement of a face plate 20 without the use of screws.

FIGS. 13–15 illustrate one embodiment of a screwless face plate 20 in accordance with the present invention. In selected embodiments, a face plate 20 may include engagement prongs 70. The engagement prongs 70 may engage a fixture 12 and maintain the face plate 20 aligned and secured thereto. Thus, once a face plate 20 has been attached, a complete fixture 12 assembly may be quickly and easily wired and then secured to a corresponding connection box 14.

Selected fixtures 12 in accordance with the present invention may include flanges 72. Flanges 72a, 72b may extend away from a main body 74 of a fixture 12 in a longitudinal direction 11a. In selected embodiments, the flanges 72 may include an aperture 64 to accommodate the securement of an anchor 16. Additional apertures 66 may provide locations for the engagement prongs 70 of the face plate 20 to engage the flanges 72. In certain embodiments, extensions 68 or "dog ears" 68 may be selected to hold the fixture 12 flush with the wall paneling.

Engagement prongs 70 in accordance with the present invention may be formed to have multiple hooks 76a, 76b, 76c, 76d. The hooks 76 may be secured to the face plate 20 by flexible necks 78a, 78b, 78c, 78d, respectively. A flex clearance 80 may be provided between the hooks 76 so that as the prong 70 is inserted through an aperture 66, the hooks 76 may deflect toward each other, thus, effectively reducing the diameter of the prong 70. Once the prong 70 has passed through the aperture 66, the hooks 76 may return to their neutral position and engage the edges of the aperture 66.

Figure 16:
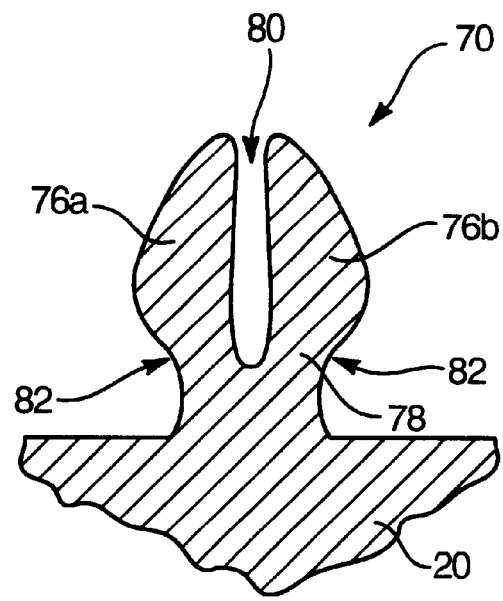
FIG. 16 is a side cross-sectional view of an engagement prong in accordance with the present invention.
Figure 17:
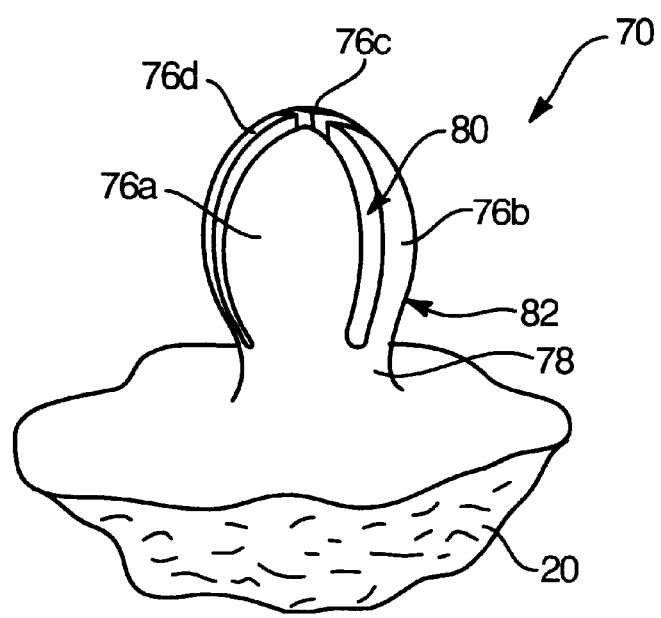
FIG. 17 is a perspective view of an engagement prong in accordance with the present invention.

Referring to FIGS. 16 and 17, in selected embodiments, the hooks 76 may be shaped to release at a desired removal loading, thus, once the face plate 20 is removed, the face plate 20 may be used again. For example, the hooks 76 may be provided with an inside taper 82. The inside taper 82 may allow each hook 76 to gradually flex and bend towards the flex clearance 80 as the face plate 20 is pulled away from the fixture 12 so that the effective diameter of the engagement prong 70 may be reduced and the prong 70 may be removed from the aperture 66. In an alternative embodiment, a face plate 20 in accordance with the present invention may be removed by applying sufficient force to fail the hooks 66.

A screwless face plate 20 in accordance with the present invention may be formed of any suitable material. This material may be selected based on several characteristics including cost, aesthetics, dielectric constant, thermal capacity, strength, toughness, flexibility, formability, and the like.

Engagement prongs 70 in accordance with the present invention may have any suitable configuration. The number of prongs 70 may range from one to several and be selected to provide a balanced securement between a face plate 20 and a fixture 12. The number of hooks 76 making up each prong 70 may also range from one to several depending on a desired engagement strength, ease of manufacture, ease of installation, ease of removal, and the like. In certain embodiments, the engagement strength may be balanced with a desired release loading. The general shape or contour of the prongs 70 may also be selected to provide a desired engagement strength, ease of manufacture, case of installation, case of removal, and the like.

Figure 18:
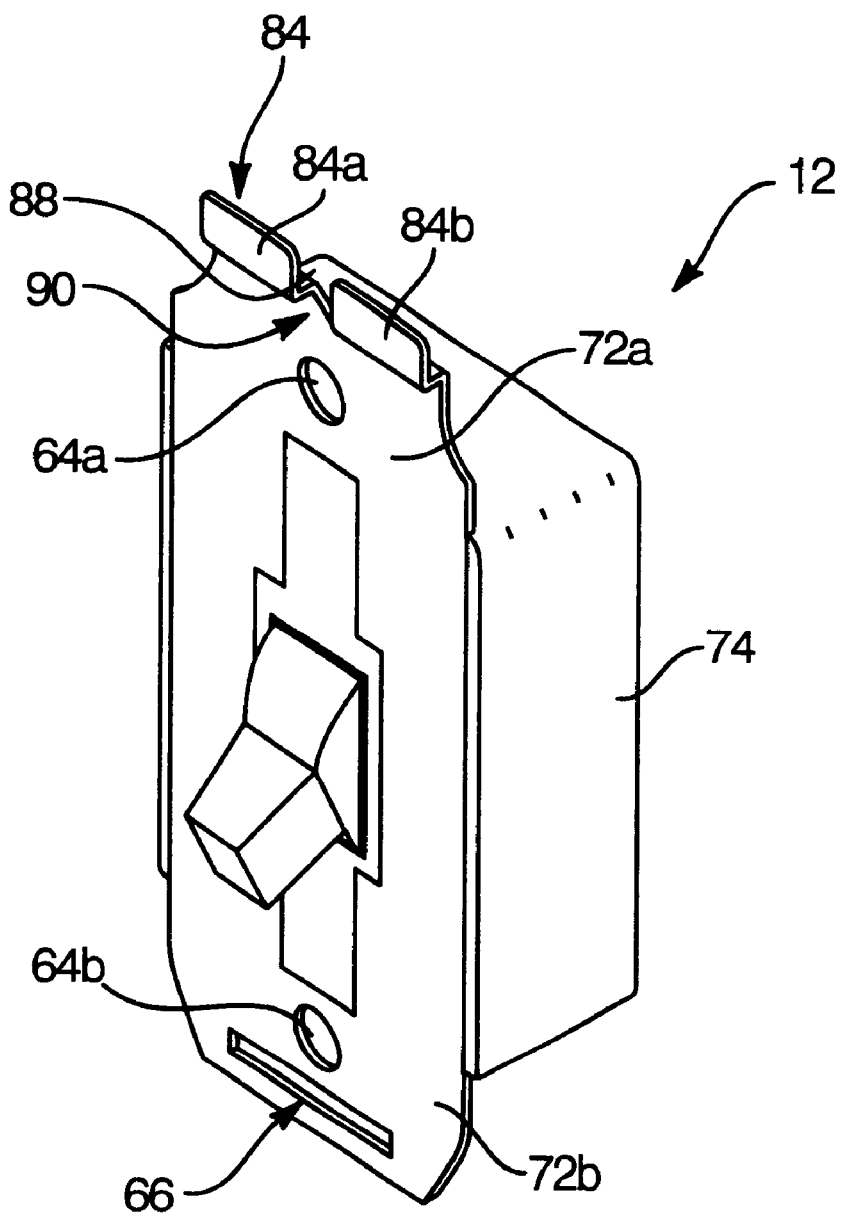
FIG. 18 is a perspective view of an alternative embodiment of a screwless face plate in accordance with the present invention.
Figure 18:
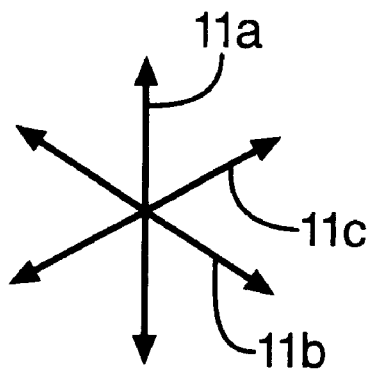

Referring to FIGS. 18–20, alternative embodiments in accordance with the present invention may employ alternative methods for securing a screwless face plate 20 to a fixture 12. In one alternative embodiment, a flange 72a of a fixture 12 may have an engagement lip 84 formed therein. A extension 86 may be formed in association with a corresponding face plate 20. The engagement lip 84 may be configured to fit behind the extension 86 to hold the upper portion of the face plate 20 to the flange 72a.

An aperture 66 may be formed in a flange 72b of the fixture 12. A corresponding engagement prong 70 may be formed in association with the face plate 20. The prong 70 illustrated in FIGS. 18–19 is an example of a single hook, rectangular prong 70. The aperture 66 may be shaped to correspond to the design of the prong 70. In selected embodiments, the lip 84/extension 86 and aperture 66/prong 70 combinations may cooperate to secure the face plate 20 to the fixture 12. Such an embodiment may be installed by first inserting the lip 84 behind the extension 86 and then rotating the face plate 20 down against the fixture 12 until the prong(s) 70 may be inserted into the corresponding aperture(s) 66. The prong 70 engagement may provide a tie to resist the tendency of the lip 84 to disengage from the extension 86.

An engagement lip 84 in accordance with the present invention may be divided into multiple engagement lips 84. In selected embodiments, an upper flange 72a may be formed into two lips 84a, 84b. The lips 84a, 84b may be separated by a notch 88. A stop 90 may be formed as part of a corresponding extension 86. The stop 90 may fit into the notch 88 to prevent lateral motion between the upper flange 72a and the face plate 20.

In certain embodiments, ends 92 may form an enclosure 94 in combination with an extension 86 and corresponding face plate 20. The ends 92 may function to laterally retain the lip 84 of a flange 72a, when assembled.

In selected embodiments, a face plate 20 in accordance with the present invention may have an access notch 96. In certain embodiments, an access notch 96 may simply provide a hold to permit the application of force to "pop" a face plate 20 from a corresponding fixture 12. In alternative embodiments, the access notch 96 may provide access behind the face plate 20 to a slender tool. The slender tool may then be used to assist in the release of a an engagement prong 70.

Figure 21:
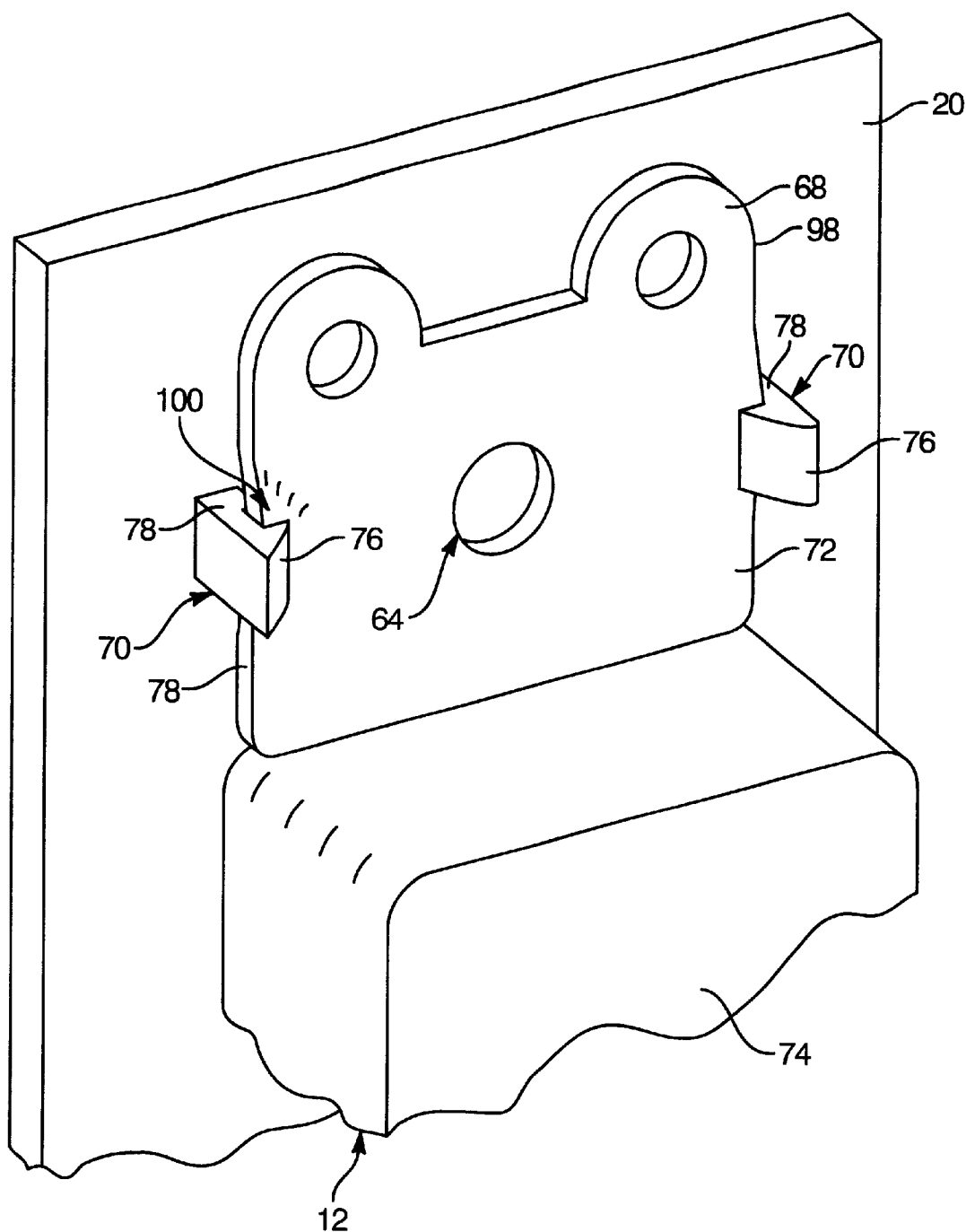
FIG. 21 is a partial perspective view of alternative engagement between a screwless face plate and an fixture in accordance with the present invention.
Figure 21:
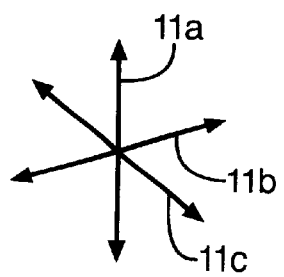

Referring to FIG. 21, an alternative embodiment of an engagement between a screwless face plate 20 and a fixture 12 may involve the engagement of an edge 98 of the flanges 72 of the fixture 12. One or more of the engagement prongs 70 of the face plate 20 may be configured to engage an edge 98. In selected embodiments, the prongs 70 may be formed to have a hook 76 and a flexible neck 78. In certain embodiments, a flange 72 may include a formation 100 to resist motion in a longitudinal direction 11a of a face plate 70 with respect thereto. Such a formation 100 may be formed by bending, cutting and bending, notching, or similarly modifying the edge 98 to resist sliding of a prong 70 therealong in a longitudinal direction 11a.

Figure 22:
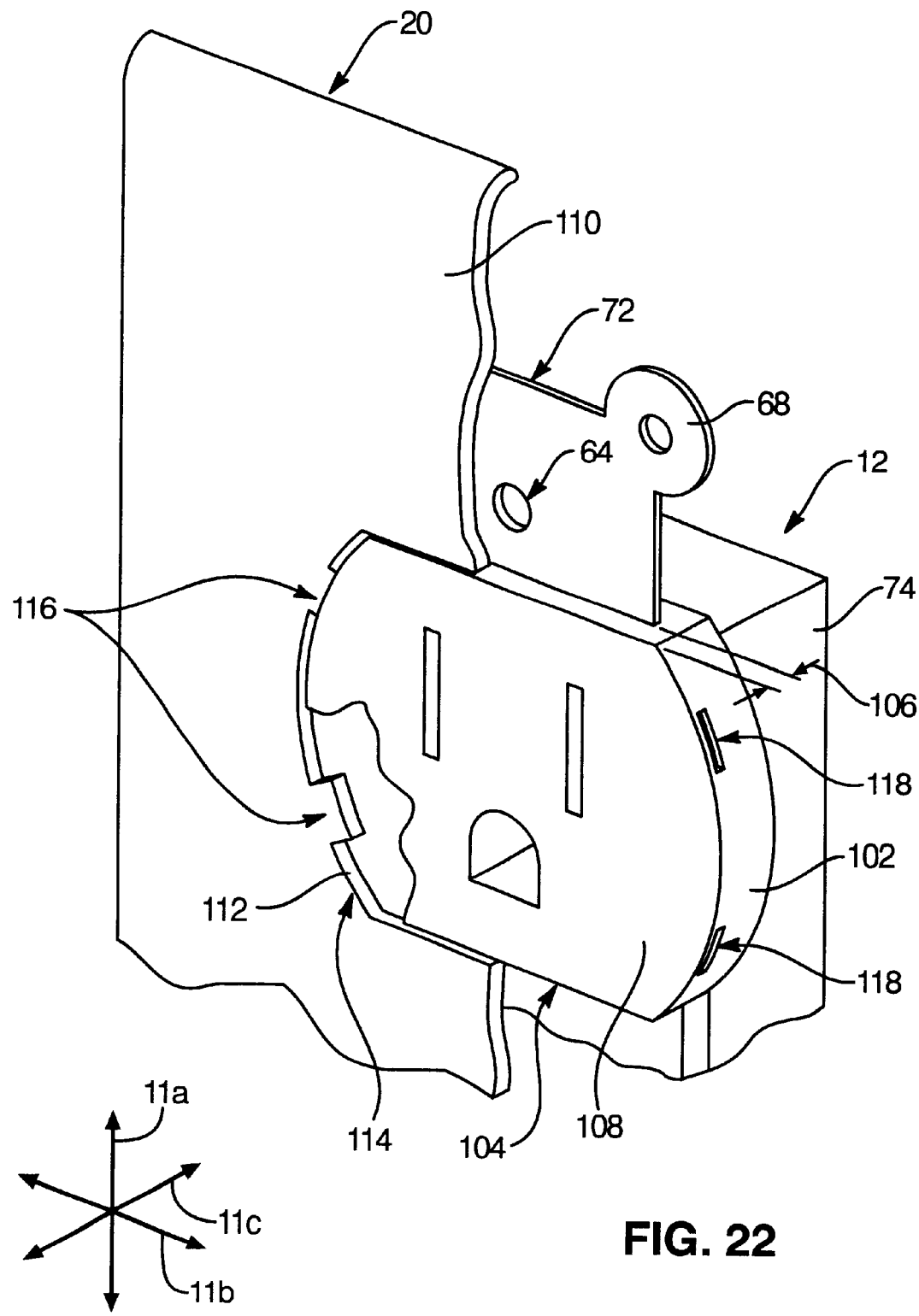
FIG. 22 is a cutaway, partial perspective view of alternative engagement between a screwless face plate and a fixture in accordance with the present invention.

Referring to FIG. 22, an alternative embodiment of an engagement between a screwless face plate 20 and a fixture 12 may involve an engagement between a face plate 20 and an interface 104 of a fixture 12. Typically, the interface 104 of a fixture 12 extends a selected distance 106 to provide a flush joint with a face plate 20. That is, the interface 104 extends to provide a facing 108 that may be substantially coplanear with a surface 110 of the face plate 20, thereby improving aesthetic appeal. The area of the facing 108 may be selected to correspond to a selected interface 104. Power outlet plugs 104 provide a relatively large surface area. In contrast, switches 104 typically have a toggle central unit and a thin border providing minimal surrounding facing 108.

The extension distance 106 of the electrical interface 104 provides the surface (substantially perpendicular to the facing 108) of an edge 102. An edge 112 of an aperture 114 (the aperture 114 may admit the interface 104 through the face plate 20) may be configured to engage the edge 102 of the interface 104. This engagement may be of any suitable form. For example, the engagement may involve any suitable combination of tabs, recesses, hooks, shoulders, and the like.

In selected embodiments, the engagement between the edges 102, 112 may involve tabs 116 formed on the face plate 20 and recesses 118 formed in the interface 104. The shape, number, and location of these corresponding pairs may be selected to provide a desired engagement strength, magnitude, and balance. Engagement strength refers to the amount of force required to apply and secure the face plate 20 to the fixture 12 or, alternatively, the force required to separate the face plate 20 from the fixture 12. The engagement strength may be selected to provide fast "snap-on" assembly without risking inadvertent removal of the face plate 20 and possible electrical shock resulting therefrom.

Figure 23:
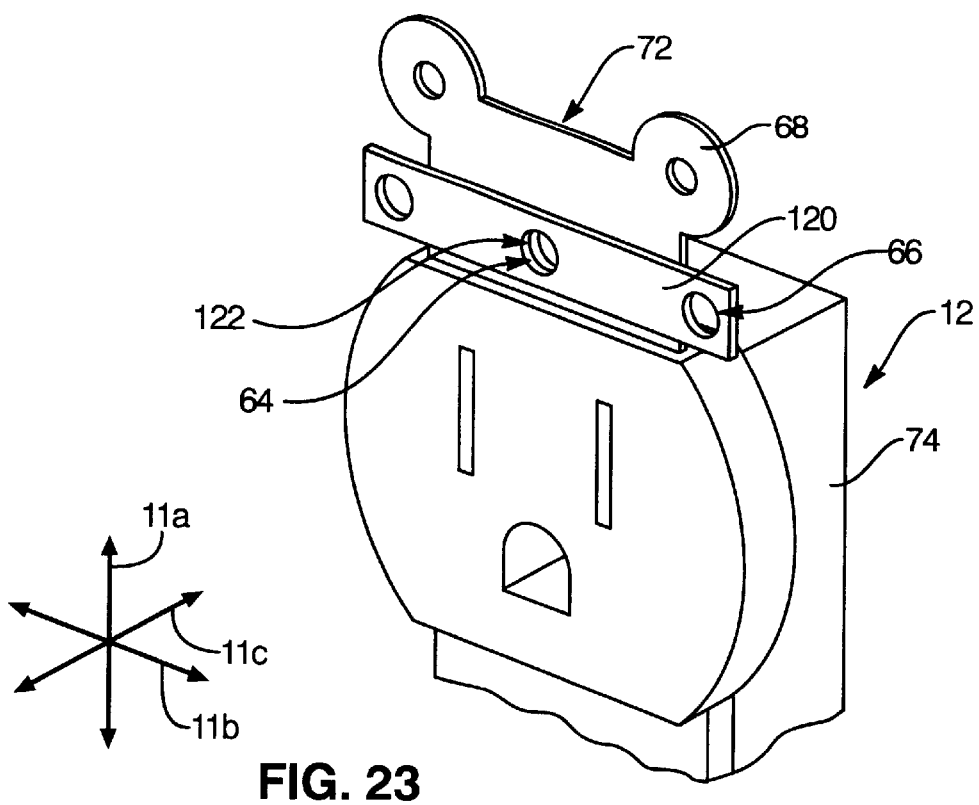
FIG. 23 is a perspective view of a fixture with an adapter in accordance with the present invention.
Figure 24:
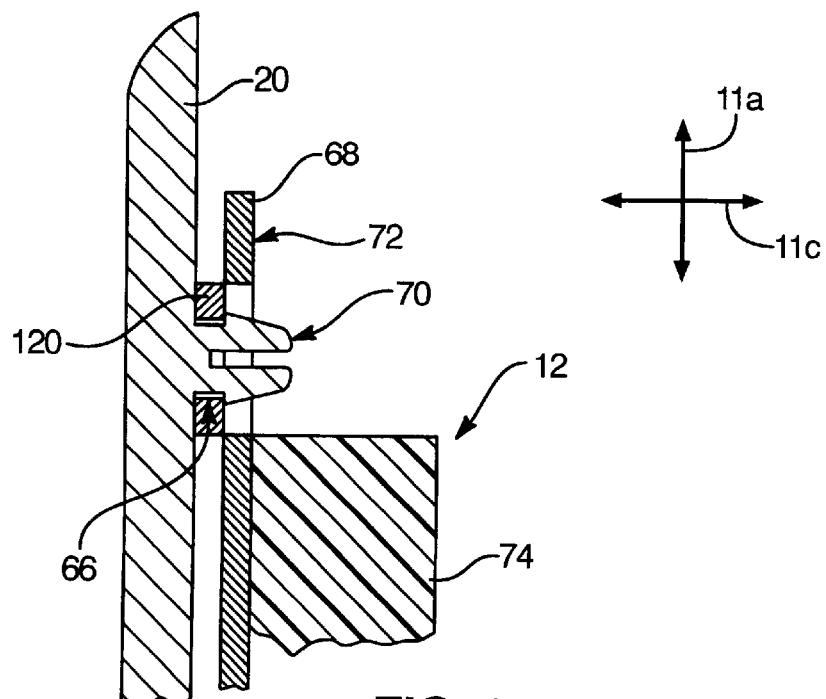
FIG. 24 is a side cross-sectional view of a fixture with an adapter in accordance with the present invention.

Referring to FIGS. 23 and 24, an adapter 120 may be provided to convert or retrofit a conventional fixture 12 to receive a screwless face plate 20. In selected embodiments, an adapter 120 in accordance with the present invention may include an aperture 122 corresponding to aperture 64 of a flange 72. A fastener 22 used to secure an anchor 16 to a fixture 12 may also pass through the aperture 122 to hold an adapter 120 in place against the flange 72. The adapter 120 may extend to provide apertures 68 for admitting the prongs 70 of a corresponding face plate 20. In this manner, a snap-on, screwless face plate 20 may be retrofitted to typical power receptacles and switches.

An adapter 120 in accordance with the present invention may be formed of any suitable material. In selected embodiments, the adapter 120 may be formed by stamping sheet metal. In an alternative embodiment, the adapter 120 may be a molded polymer or composite.

Figure 25:
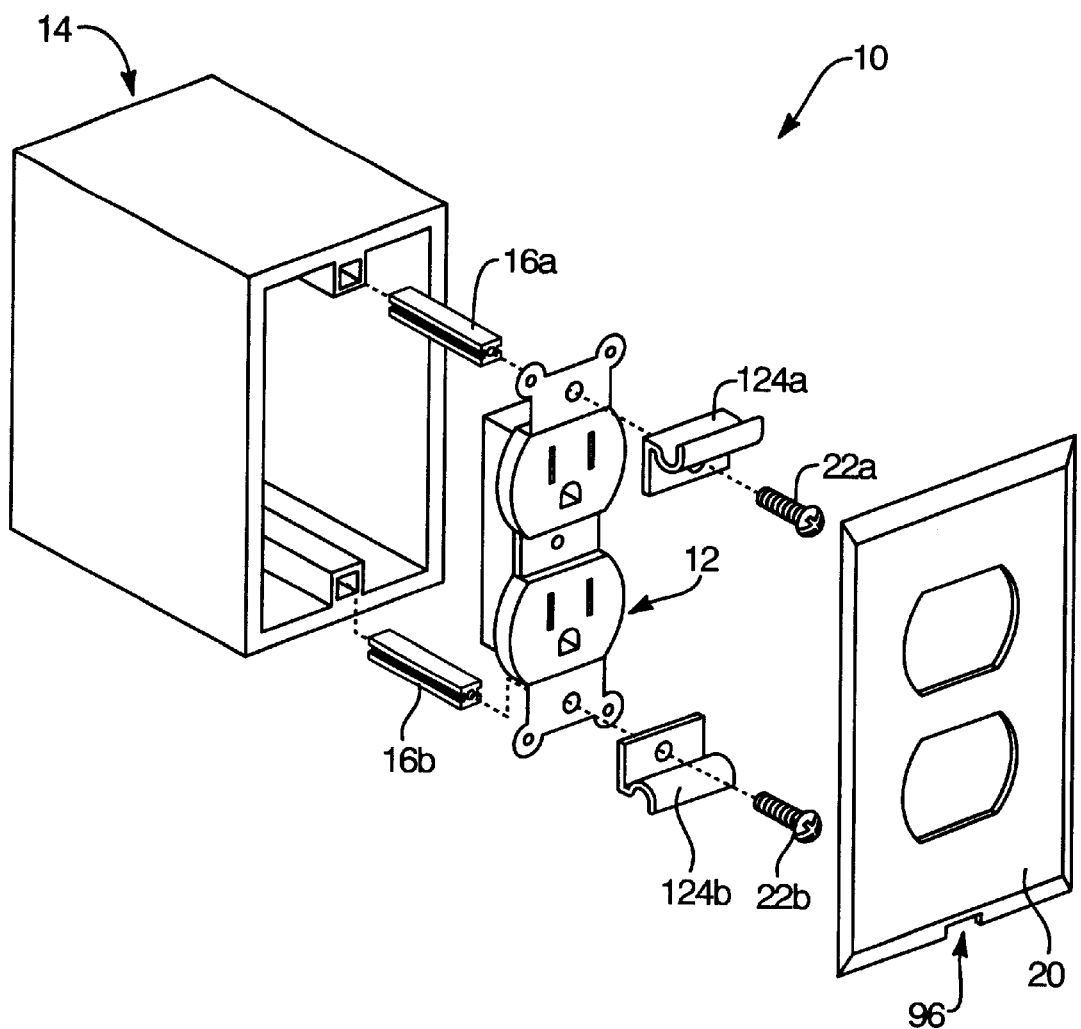
FIG. 25 is an exploded perspective view of one embodiment of a connection box assembly having clips enabling the attachment of a screwless face plate in accordance with the present invention.

Referring to FIG. 25, in certain embodiments, clips 124 may be attached to an electrical fixture 12 to retain a face plate 20 without the use of screws or other similar retainers. For example, clips 124a, 124b may be attached to an electrical fixture 12 using the fasteners 22a, 22b used to attach the anchors 16a, 16b. In an alternate embodiment, the clips 124a, 124b may be held in place by the fasteners 22a, 22b directly engaging the connection box 14.

The clips 124 may receive and retain the face plate 20 while remaining hidden from sight behind the face of the face plate 20. In certain embodiments, a notch 96 or other access point 96 may be provided to enable the insertion of a tool, finger, or other device to apply pressure to one of the clips 124 to enable the release of the face plate 20 from the electrical fixture 12 or connection box 14. The notch 96 may be located on the face plate 20 such that it is substantially hidden or inconspicuous. For example, the notch 96 may be located on the bottom of the face plate 20 where it may be substantially hidden from the view.

Figure 26:
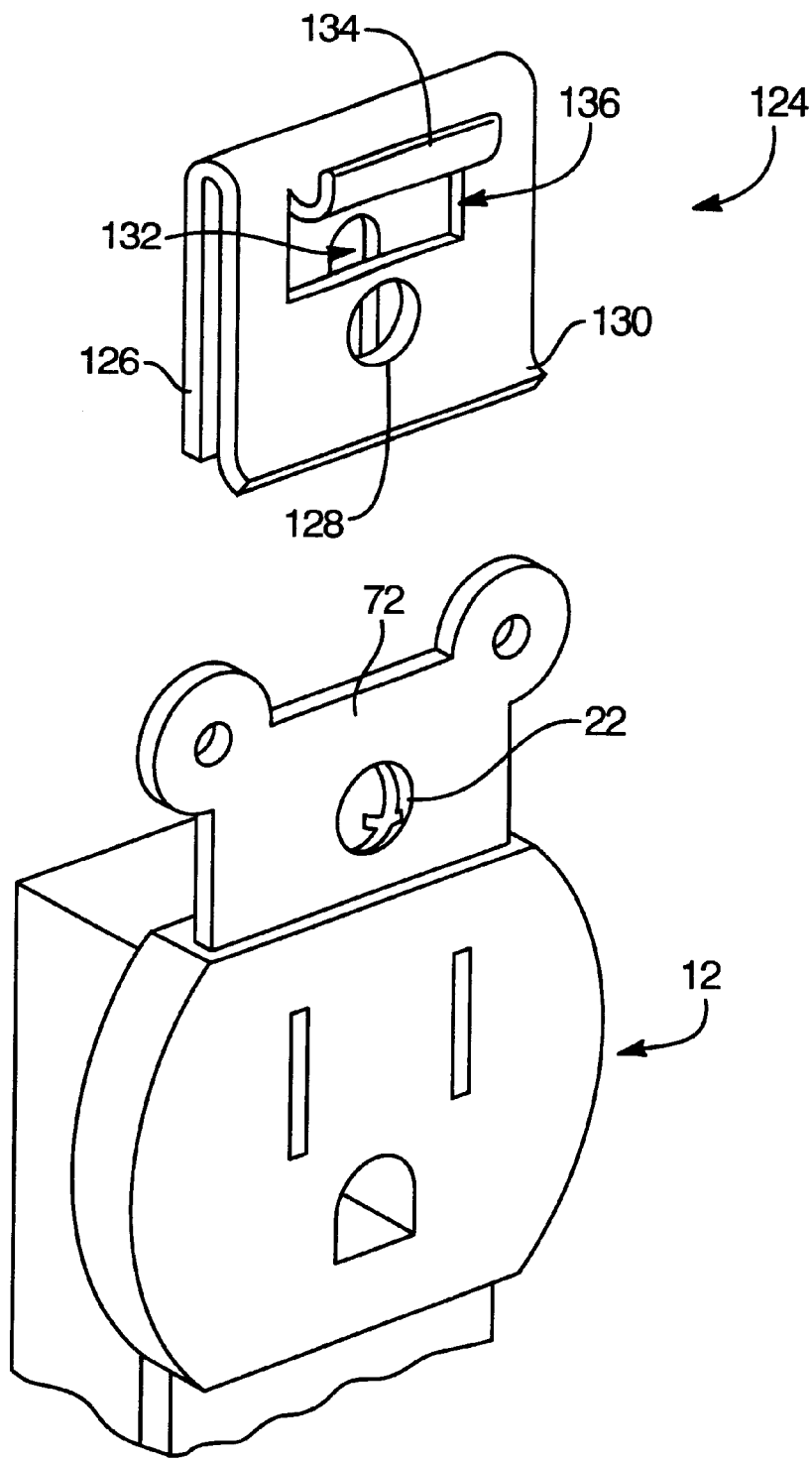
FIG. 26 is a perspective view an embodiment of a clip that attaches to an electrical fixture in accordance with the present invention.

Referring to FIG. 26, a clip 124 may have a shape selected to engage the flange 72 of the fixture 12. For example, the clip 124 may be curved or shaped to include a back face 126 in order to sandwich a flange 72 of the electrical fixture 12. This design may be useful to retrofit existing electrical fixtures 12 to receive a screwless face plate 20.

A clip 124 in accordance with the present invention may be formed of any suitable material. For example, a clip 124 may be formed from a single sheet or panel of metal (e.g. steel), plastic, or the like. Likewise, the clip may be formed (e.g. molded, extruded, cast, machined, stamped, or the like) as needed using any suitable method.

A clip 124 may include an aperture 128 that may accommodate a fastener 22. The aperture 128 may provide clearance for the fastener 22, thus, enabling the clip 124 to sit flush with the surface of the flange 72. The aperture 128 may also interact with the fastener 22 to form a detent mechanism. That is, the fastener 22, in conjunction with the aperture 128, may act as a piloting mechanism to effectively align and situate the clip 124 with respect to the flange 72.

Since the clip 124 may be used to retrofit an installed electrical fixture 12, a fastener 22 may already be positioned before the installation of the clip 124. Thus, in certain embodiments, the clip 124 may be shaped to include a lip 130. The lip 130 may enable the clip 124 to slide over a fastener 22 until the fastener 22 is aligned with the aperture 128. Because the fastener 22 may extend from the electrical fixture 12 to an connection box 14 or other object 14, a slot 132 may be provided in the back face 126 to enable the clip 124 to slide over the threaded portion of the fastener 22.

A retainer 134 in accordance with the present invention may extend from the clip 130 to engage a face plate 20. As stated hereinabove, the clip 124 may be formed from a single metal or other uniform stock material. Thus, a retainer 134 may be bent, shaped, stamped, or the like from the clip 124, leaving an opening 136. Nevertheless, the clip 124 may be formed using other methods, such as casting, extrusion, molding, machining, or the like, and need not be limited to the example described herein.

Figure 27:
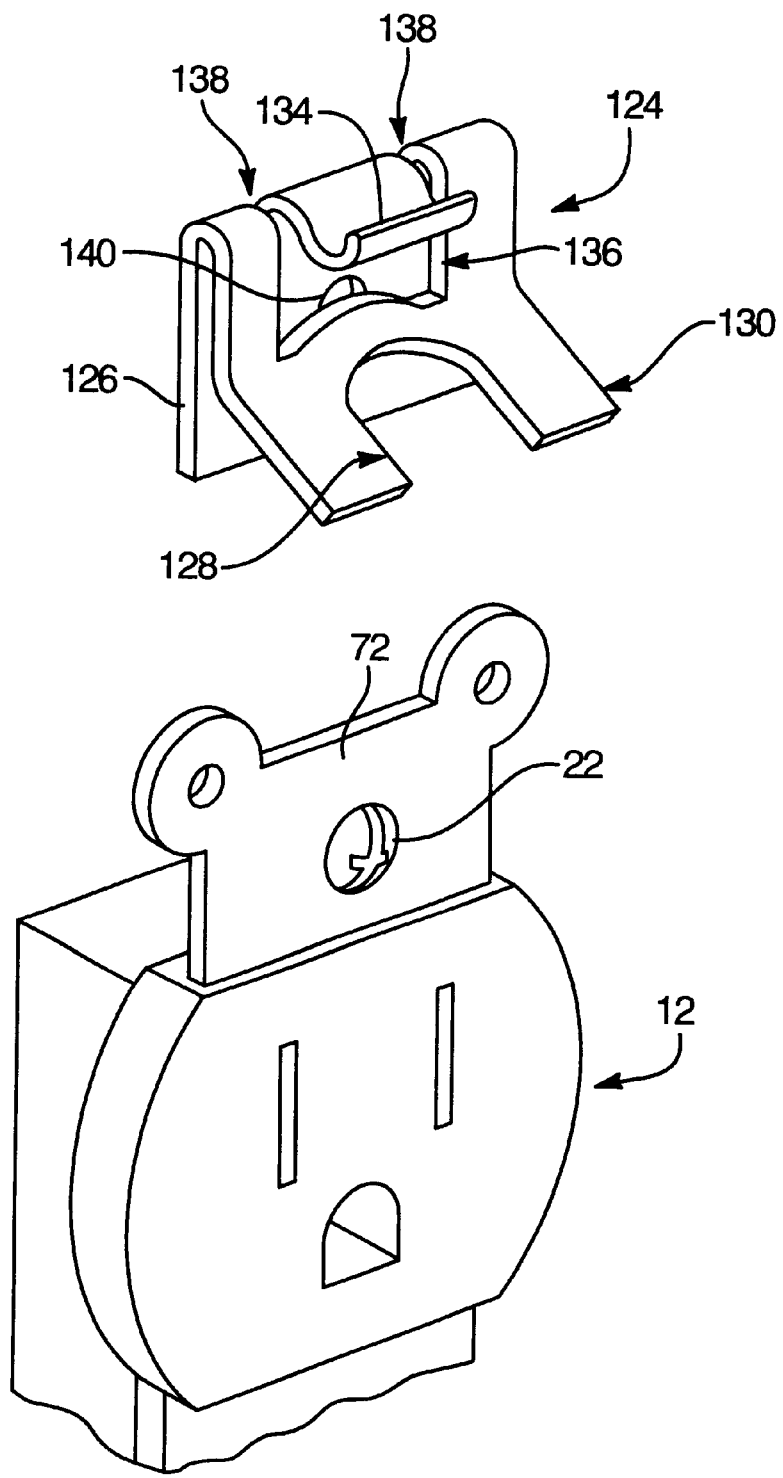
FIG. 27 is a perspective view an alternative embodiment of a clip that attaches to an electrical fixture in accordance with the present invention.

Referring to FIG. 27, clips 130 in accordance with the present invention may be formed in any manner that may aid in ease of assembly and increase the integrity of the engagement between the clip 30 and the face plate 20. For example, slots 138 may be formed where the retainer 134 connects to the rest of the clip 124. If desired, the slots 138 may extend a selected distance into the back face 126. The slots 138 may increase flexibility and deflection of the retainer 134, thus providing a smoother engagement with the face plate 20. In certain embodiments, the slots 138 may terminate in a rounded end to resist the formation of a stress riser upon deflection of the retainer 134.

In certain embodiments, a lip 130 may be formed to extend a substantial distance from the clip 124. An extended lip 130 may provide a spring biasing the retainer 134 into a firm engagement with the face plate 20. That is, the lip 130 may act as a spring to substantially remove the play between the retainer 134 and the face plate 20. If desired, an aperture 140 may be formed in the back face 126 of the clip 124 to permit a fastener 22 to pass therethrough.

Figure 28:
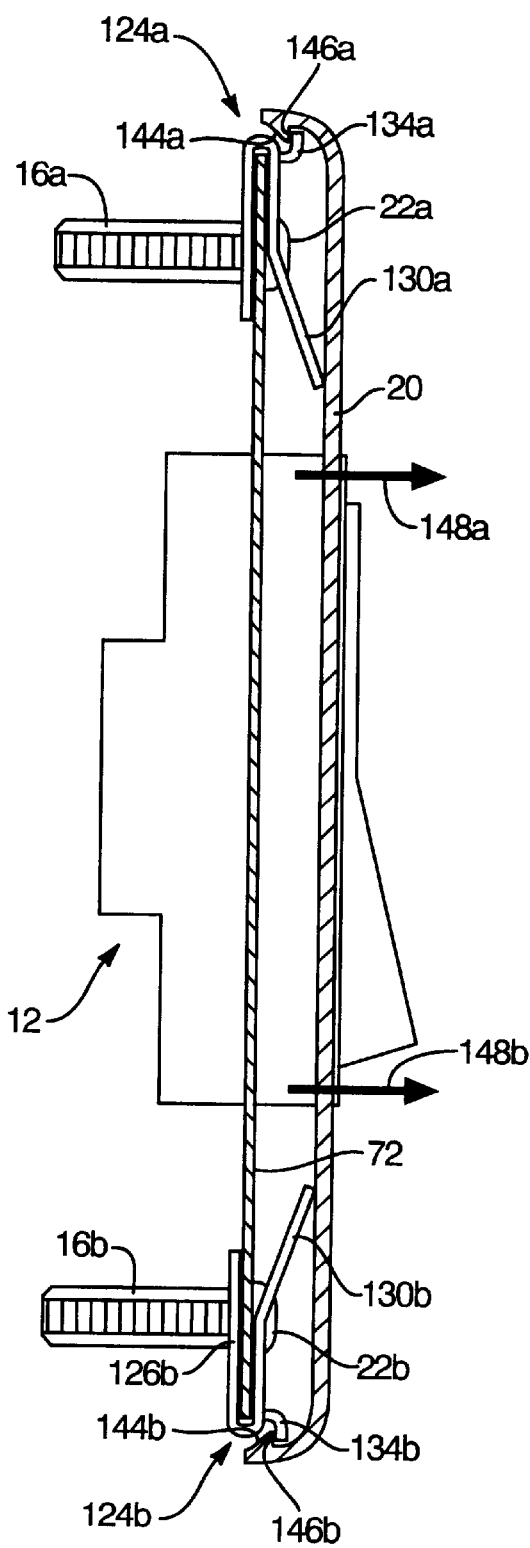
FIG. 28 is a side cross-sectional view of the clip embodiment of FIG. 27 applied to an electrical fixture and a face plate.

Referring to FIG. 28, a face plate 20 may include one or more barbs 142 located to engage the retainers 134. The barbs may include a ramp 144 and an engagement edge 146. When a face plate 20 is applied to a electrical fixture 12, the retainers 134 may deflect while sliding along the ramps 144 until passing over the engagement edges 146. Once the retainer 134 has engaged the engagement edge 146, the lips 130a, 130b may exert a forces 148a, 148b on the face plate 20. The forces 148a, 148b may urge the retainers 134a, 134b against engagement edges 146a, 146b, thus reducing the play that may be present in the engagement of the fixture 12 with the face plate 20.

In an alternative embodiment, one of the clips 124 may be formed of a substantially rigid material (e.g. substantially non-deflectable material) and the other 124 may be formed from a comparatively deflectable material. Thus, in this embodiment, a substantially rigid clip 124 may be initially placed over a first engagement edge 146a and a deflectable clip 124 may be slid along the ramp 144b until it engages a second engagement edge 146b.

As previously described, notch 96 may provide access to the retainer 134. Thus, a tool, finger, or other device may mechanically urge deflection of the retainer 134, thereby releasing the face plate 20 from the electrical fixture 12.

Figure 29:
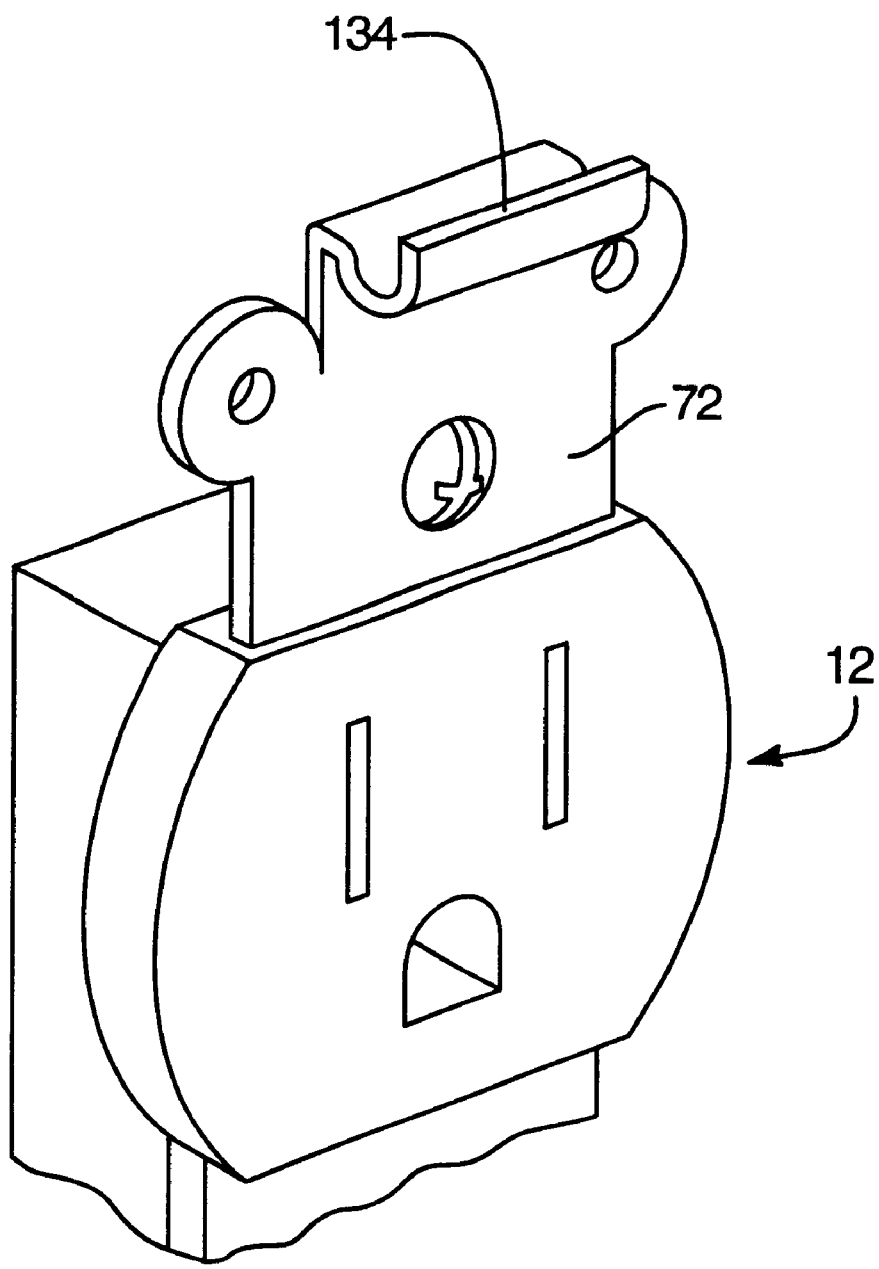
FIG. 29 is a perspective view of a retainer integrally formed as part of the flange of a electrical fixture for attaching a screwless face plate in accordance with the present invention.

Referring to FIG. 29, in instances where a retrofitted solution is not needed, an electrical fixture 12 may include a retainer 134 formed as part of a flange 72. The retainer 134 and flange 72 may be formed (e.g. molded, extruded, cast, machined, stamped, or the like) from a single homogenous material. In addition, the number, bulk, and inconvenience of multiple components may be reduced.

Figure 30:
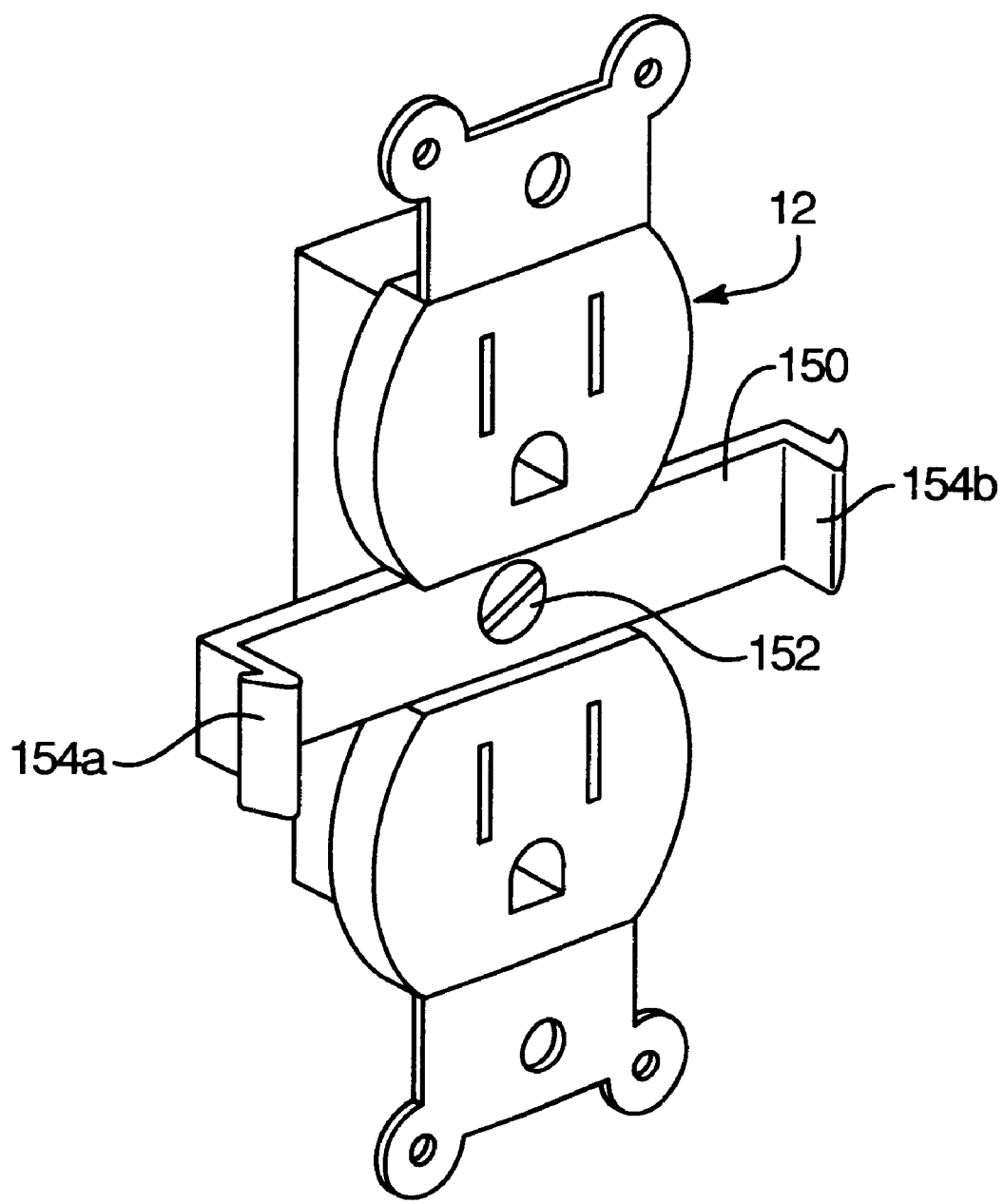
FIG. 30 is a perspective view of an embodiment of an adapter that may be used to attach a screwless face plate to an electrical fixture in accordance with the present invention.

Referring to FIG. 30, in other embodiments, an adapter 150 for use with a screwless face plate 20 may be attached to an electrical fixture 12 using a fastener 152. For example, a screw 152 normally used to attach a face plate 20 to an electrical fixture 12 may be used to attach an adapter 150 to the fixture 12. The adapter 150 may include one or more barbs 154a, 154b to receive and retain a screwless face plate 20. In the illustrated embodiment, the barbs 154a, 154b may engage the interior side edges of the face plate 20. However, the adapter 150 may be alternatively configured to contact the face plate 20 in a plurality of other locations.

Figure 31:
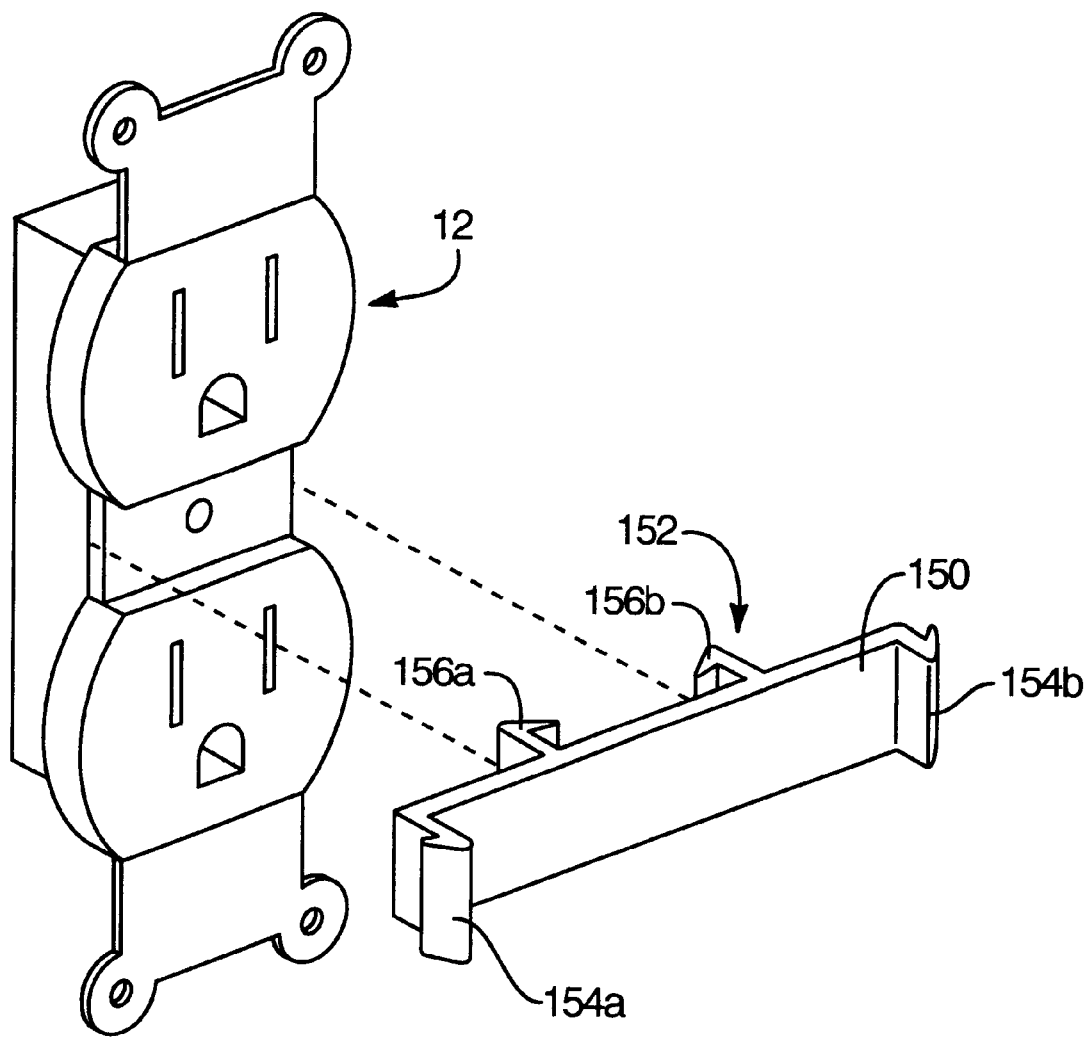
FIG. 31 is a perspective view of an alternative embodiment of an adapter that may be attached to an electrical fixture without the use of tools.

Referring to FIG. 31, in another embodiment, a fastener 152 may support securement of the adapter 150 to the electrical fixture 20 without the use of tools. For example, a fastener 152 may include clips 156a, 156b formed as an integral part of an adapter 150. The clips 156a, 156b may clip onto or attach to the fixture 12. Thus, the adapter 150 may both attach to the fixture 12 and to the face plate 20 without the use of tools.

From the above discussion, it will be appreciated that the present invention provides an apparatus and method for fast and simple connection box assembly without screw rotation and the time associated therewith. An embodiment in accordance with the present invention may provide an apparatus for securing a fixture to a connection box.

In a factory manufacturing process an anchor may be secured to a fixture. The anchor may have an engagement mechanism formed therewith. A connection box may be provided to house wires proceeding from a source to terminate therein. A receiver may be associated with the connection box. The receiver may have an engagement mechanism formed to receive and retain the engagement mechanism of the anchor. Thus, the anchor and receiver may be intermediaries in the securement of the fixture to the connection box.

Face plates in accordance with the present invention may have engagement prongs. These prongs may be inserted through apertures in a corresponding fixture to maintain the face plate aligned securely thereagainst. A face plate may be installed by simply pressing the engagement prongs through the appropriate apertures in the fixture. Alternatively, a fixture may be fitted with clips having retainers for engaging corresponding barbs formed in the face plates. In such an embodiment, a face plate may be installed by pressing a fixture thereagainst until the retainers engage the barbs.

Once a fixture has been wired and a face plate applied thereto, the resulting assembly may be secured to the connection box by inserting one or more of the attached anchors into corresponding receivers associated with the connection box. The anchor may be inserted a depth into the receiver selected to properly position the face plate. Insertion of an anchor into a receiver may be accomplished without the aid of tools.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An apparatus for securing a face plate to an electrical fixture without the use of tools, the apparatus comprising:
    an electrical fixture;
    a face plate to cover the electrical fixture, the face plate having an engagement region;
    a clip to receive and retain the engagement region of the face plate without the use of tools; and
    the clip further comprising an attachment mechanism to secure the clip to the electrical fixture without the use of tools; and
    the clip formed of a resiliently deflectable material to enable the retention and release of the face plate.

2. The apparatus of claim 1, wherein the attachment mechanism is an attachment clip to engage the electrical fixture by sliding over the surface thereof.

3. The apparatus of claim 2, wherein the electrical fixture further comprises a protuberance, and the attachment clip is further provided with an aperture to slide over and align with the protuberance.

4. The apparatus of claim 3, further comprising a release to enable a user to selectively release the face plate from the clip.

5. The apparatus of claim 4, wherein the clip further comprises a hook to en gage the engagement region and resist the release thereof.

6. The apparatus of claim 5, wherein the clip and the attachment mechanism are monolithically formed.

7. The apparatus of claim 6, wherein the face plate has an upper portion and a lower portion and the clip comprises an upper component to engage the upper portion, and a lower component to engage the lower portion.

8. An apparatus for securing a face plate to an electrical fixture without the use of tools, the apparatus comprising:
    an electrical fixture;
    a face plate to cover the electrical fixture, the face plate having an engagement region;
    a clip to receive and retain, the engagement region of the face plate without the use of tools;
    the clip further comprising an attachment mechanism to secure the clip to the electrical fixture, wherein the clip and the attachment mechanism are monolithically formed; and
    the clip formed of a resiliently deflectable material to enable the retention and release of the face plate.

9. The apparatus of claim 8, further comprising a release to enable a user to selectively release the face plate from the clip.

10. The apparatus of claim 9, wherein the attachment mechanism secures the clip to the electrical fixture without the use of tools.

11. The apparatus of claim 10, wherein the clip further comprises a hook to engage the engagement region and resist the release thereof.

12. The apparatus of claim 11, wherein the face plate has an upper portion and a lower portion and the clip comprises an upper component to engage the upper portion, and a lower component to engage the lower portion.

13. An apparatus for securing a face plate to an electrical fixture without the use of tools, the apparatus comprising:
    an electrical fixture;
    a face plate to cover the electrical fixture, the face plate having first and second edges and first and second engagement regions, the first engagement region positioned proximate the first edge and the second engagement region positioned proximate the second edge;
    a first clip to receive and retain, without the use of tools, the first engagement region of a face plate;
    a second clip to receive and retain, without the use of tools, the second engagement region of a face plate;
    the first and second clips each further comprising an attachment mechanism to attach the first and second clips, respectively, to the electrical fixture without the use of tools; and
    the first and second clips formed of a resiliently deflectable material to enable the retention and release of the respective first and second engagement regions of the face plate.

14. The apparatus of claim 13, wherein the attachment mechanisms are attachment clips to engage the electrical fixture by sliding over the surface thereof.

15. The apparatus of claim 14, wherein the electrical fixture further comprises a protuberance, and at least one of the attachment clips is further provided with an aperture to slide over and align with the protuberance.

16. The apparatus of claim 15, further comprising a release to enable a user to selectively release the face plate from the first and second clips.

17. The apparatus of claim 16, wherein at least one of the first and second clips further comprises a hook to engage at least one of the first and second engagement regions to resist the release thereof.

18. The apparatus of claim 12, wherein the first clip and the corresponding attachment mechanism are monolithically formed of sheet metal.

19. An apparatus comprising:
    an electrical fixture comprising a body with first and second flanges extending in opposite directions therefrom;
    a first clip securing to the first flange and having a first retainer extending therefrom;
    a second clip, independent from the first clip, securing to the second flange and having a second retainer extending therefrom; and
    a face place having first and second engagement regions engaging the first and second retainers, respectively, without the use of tools to secure the face plate with respect to the electrical fixture.

20. The apparatus of claim 19, wherein the first clip has a front face and a back face, the front and back faces positioned to secure the first flange therebetween.

21. The apparatus of claim 20, wherein at least one of the front face and back face comprises a raised lip to facilitate insertion of the first clip over the first flange.

22. The apparatus of claim 19, wherein the clip is formed from a resiliently deflectable sheet metal to enable the retention and release of the face plate.

23. The apparatus of claim 19, wherein the first retainer is formed as a hook.

24. The apparatus of claim 23, wherein the first engagement region includes a ramp and engagement edge, the ramp being positioned to deflect the first retainer over the engagement edge.

* * * * *